US009882721B2

(12) United States Patent
Kawamoto et al.

(10) Patent No.: US 9,882,721 B2
(45) Date of Patent: Jan. 30, 2018

(54) AUTHENTICATION USING ELECTRONIC SIGNATURE

(71) Applicant: SONY CORPORATION, Minato-ku (JP)

(72) Inventors: Yohei Kawamoto, Tokyo (JP); Yu Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/366,418

(22) PCT Filed: Aug. 22, 2013

(86) PCT No.: PCT/JP2013/004971
§ 371 (c)(1),
(2) Date: Jun. 18, 2014

(87) PCT Pub. No.: WO2014/034054
PCT Pub. Date: Mar. 6, 2014

(65) Prior Publication Data
US 2014/0331056 A1 Nov. 6, 2014

(30) Foreign Application Priority Data
Aug. 30, 2012 (JP) .................. 2012-190446

(51) Int. Cl.
*H04L 9/30* (2006.01)
*H04L 9/32* (2006.01)

(52) U.S. Cl.
CPC .............. *H04L 9/3247* (2013.01); *H04L 9/30* (2013.01); *H04L 9/3234* (2013.01); *H04L 9/3093* (2013.01); *H04L 9/3218* (2013.01)

(58) Field of Classification Search
CPC ....... H04L 9/3236; H04L 9/3247; H04L 9/30; H04L 9/3234; H04L 9/0643;
(Continued)

(56) References Cited

U.S. PATENT DOCUMENTS 5,537,475 A * 7/1996 Micali ................... H04L 9/3255
380/277
5,694,471 A * 12/1997 Chen ..................... G06Q 20/347
235/379

(Continued)

FOREIGN PATENT DOCUMENTS

DE 10 2010 050 195 A1 5/2012
JP 2902087 B2 6/1999

OTHER PUBLICATIONS

Roland, M.; Langer, J., "Digital Signature Records for the NFC Data Exchange Format," Apr. 20, 2010, 2010 Second International Workshop on Near Field Communication, pp. 71-76.*

(Continued)

*Primary Examiner* — Nelson Giddins
(74) *Attorney, Agent, or Firm* — Chip Law Group

(57) ABSTRACT

An information processing system comprising interface circuitry configured to receive message-independent information, the message-independent information having been generated by another apparatus and transferred to the interface in advance of a digital signature being generated, send message-dependent information to an external device, and receive a digital signature from the external device; and processing circuitry configured to generate the message-dependent information from a message and at least a part of the message-independent information, and associate the digital signature with the message.

24 Claims, 16 Drawing Sheets

(58) Field of Classification Search
CPC ... H04L 9/3093; H04L 9/3218; H04L 9/3221; H04L 9/3223
See application file for complete search history.

(56) References Cited

U.S. PATENT DOCUMENTS

| | | | | |
|---|---|---|---|---|
| 6,859,533 B1* | 2/2005 | Wang | ............... | H04L 9/14 380/259 |
| 7,117,364 B1* | 10/2006 | Hepper | ............... | G06Q 20/3552 713/168 |
| 7,286,665 B1* | 10/2007 | Wang | ............... | H04L 9/002 380/282 |
| 7,305,558 B1* | 12/2007 | Miyazaki | ............... | H04L 9/321 713/178 |
| 7,577,852 B2* | 8/2009 | Okazaki | ............... | G06F 21/52 713/164 |
| 8,930,707 B2* | 1/2015 | Arunan | ............... | H04L 9/3247 455/41.1 |
| 8,966,268 B2* | 2/2015 | Marien | ............... | G06F 21/34 713/172 |
| 9,252,955 B2* | 2/2016 | Chamberlin | ............... | G06F 21/31 |
| 2003/0005289 A1* | 1/2003 | Gougeon | ............... | G06Q 20/341 713/156 |
| 2003/0005294 A1* | 1/2003 | Gougeon | ............... | G06Q 20/341 713/165 |
| 2003/0041244 A1* | 2/2003 | Buttyan | ............... | G06Q 20/20 713/172 |
| 2003/0105716 A1* | 6/2003 | Sutton, Jr. | ............... | H04L 9/3247 705/50 |
| 2005/0021941 A1* | 1/2005 | Ohmori | ............... | G11B 20/00086 713/156 |
| 2005/0114662 A1* | 5/2005 | Meyer | ............... | G06Q 20/341 713/168 |
| 2006/0059548 A1* | 3/2006 | Hildre | ............... | G06F 21/34 726/9 |
| 2006/0168447 A1* | 7/2006 | Pailles | ............... | G06Q 20/045 713/176 |
| 2006/0212394 A1* | 9/2006 | Terada | ............... | G06Q 20/105 705/41 |
| 2007/0245148 A1* | 10/2007 | Buer | ............... | H04L 9/3271 713/182 |
| 2008/0005034 A1* | 1/2008 | Kravitz | ............... | G06F 21/10 705/59 |
| 2008/0016333 A1* | 1/2008 | Cao | ............... | G06F 21/34 713/155 |
| 2008/0065887 A1* | 3/2008 | Grove | ............... | G06F 21/31 713/168 |
| 2008/0101601 A1* | 5/2008 | Ramani | ............... | G07D 7/0006 380/51 |
| 2008/0130895 A1* | 6/2008 | Jueneman | ............... | H04L 9/3066 380/277 |
| 2008/0152145 A1* | 6/2008 | Fujioka | ............... | G06F 21/6245 380/277 |
| 2008/0229104 A1* | 9/2008 | Ju | ............... | H04L 9/3247 713/169 |
| 2009/0010428 A1* | 1/2009 | Delgosha | ............... | H04L 9/3093 380/30 |
| 2009/0043681 A1* | 2/2009 | Shoji | ............... | G06F 21/335 705/35 |
| 2009/0235339 A1* | 9/2009 | Mennes | ............... | G06F 21/33 726/5 |
| 2010/0287038 A1* | 11/2010 | Copejans | ............... | G07B 15/063 705/13 |
| 2010/0299527 A1* | 11/2010 | Arunan | ............... | H04L 9/3247 713/176 |
| 2011/0150212 A1* | 6/2011 | Spalka | ............... | H04L 9/3073 380/44 |
| 2011/0189981 A1* | 8/2011 | Faith | ............... | G06F 1/1694 455/414.1 |
| 2011/0246780 A1* | 10/2011 | Yeap | ............... | G06Q 20/02 713/176 |
| 2011/0296188 A1* | 12/2011 | Sakumoto | ............... | H04L 9/3093 713/176 |
| 2012/0089519 A1* | 4/2012 | Peddada | ............... | G06Q 20/3829 705/71 |
| 2012/0190354 A1* | 7/2012 | Merrien | ............... | H04W 4/001 455/422.1 |
| 2012/0221859 A1* | 8/2012 | Marien | ............... | G06F 21/34 713/172 |
| 2012/0221860 A1* | 8/2012 | Hoornaert | ............... | G06F 21/34 713/172 |
| 2012/0266212 A1* | 10/2012 | Jiang | ............... | H04W 12/06 726/3 |
| 2013/0144792 A1* | 6/2013 | Nilsson | ............... | G06Q 20/20 705/67 |
| 2013/0166917 A1* | 6/2013 | Granbery | ............... | H04L 9/3247 713/179 |
| 2013/0198519 A1* | 8/2013 | Marien | ............... | G06F 21/34 713/172 |
| 2013/0326225 A1* | 12/2013 | Murao | ............... | H04L 9/3247 713/176 |
| 2015/0074421 A1* | 3/2015 | Nagai | ............... | H04L 9/0822 713/189 |
| 2015/0341345 A1* | 11/2015 | Nagai | ............... | H04L 9/0822 713/156 |

OTHER PUBLICATIONS

Roland, M.; Langer, J.; Scharinger, J., "Security Vulnerabilities of the NDEF Signature Record Type," Fe. 22, 2011, 2011 3rd International Workshop on Near Field Communicaton (NFC), pp. 65-70.*

International Search Report dated Nov. 13, 2013 in PCT/JP2013/004971.

Koichi Sakumoto, et al., "Public-Key Identification Schemes Based on Multivariate Quadratic Polynomials", Advances in Cryptology—CRYPTO 2011, LNCS 6841, XP019161037, (Aug. 14, 2011), pp. 706-723.

Amos Fiat, et al., "How to Prove Yourself: Practical Solutions to Identification and Signature Problems", Advances in Cryptology—CRYPTO '86, Proceedings of the Conference on Theory and Applications of Cryptographic Techniques (CRYPTO), vol. CONF. 6, XP000090668, (Jan. 1, 1986), pp. 186-194.

* cited by examiner

[Fig. 1]
PUBLIC-KEY AUTHENTICATION SCHEME
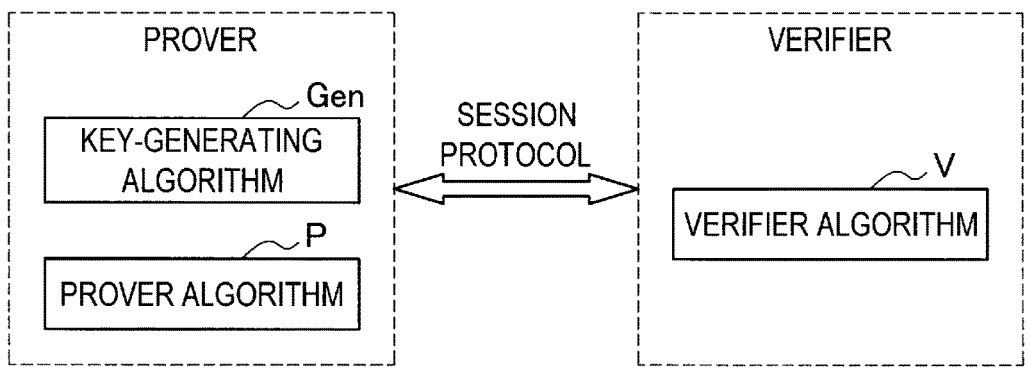
[Fig. 2]
ELECTRONIC SIGNATURE SCHEME
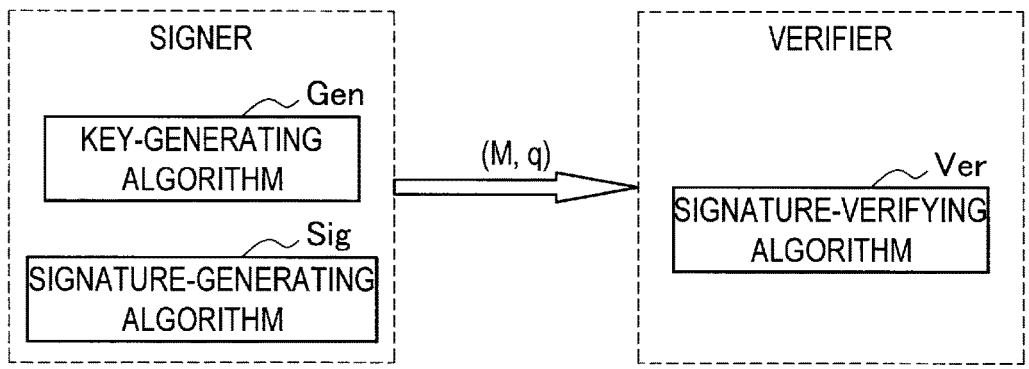

[Fig. 3]
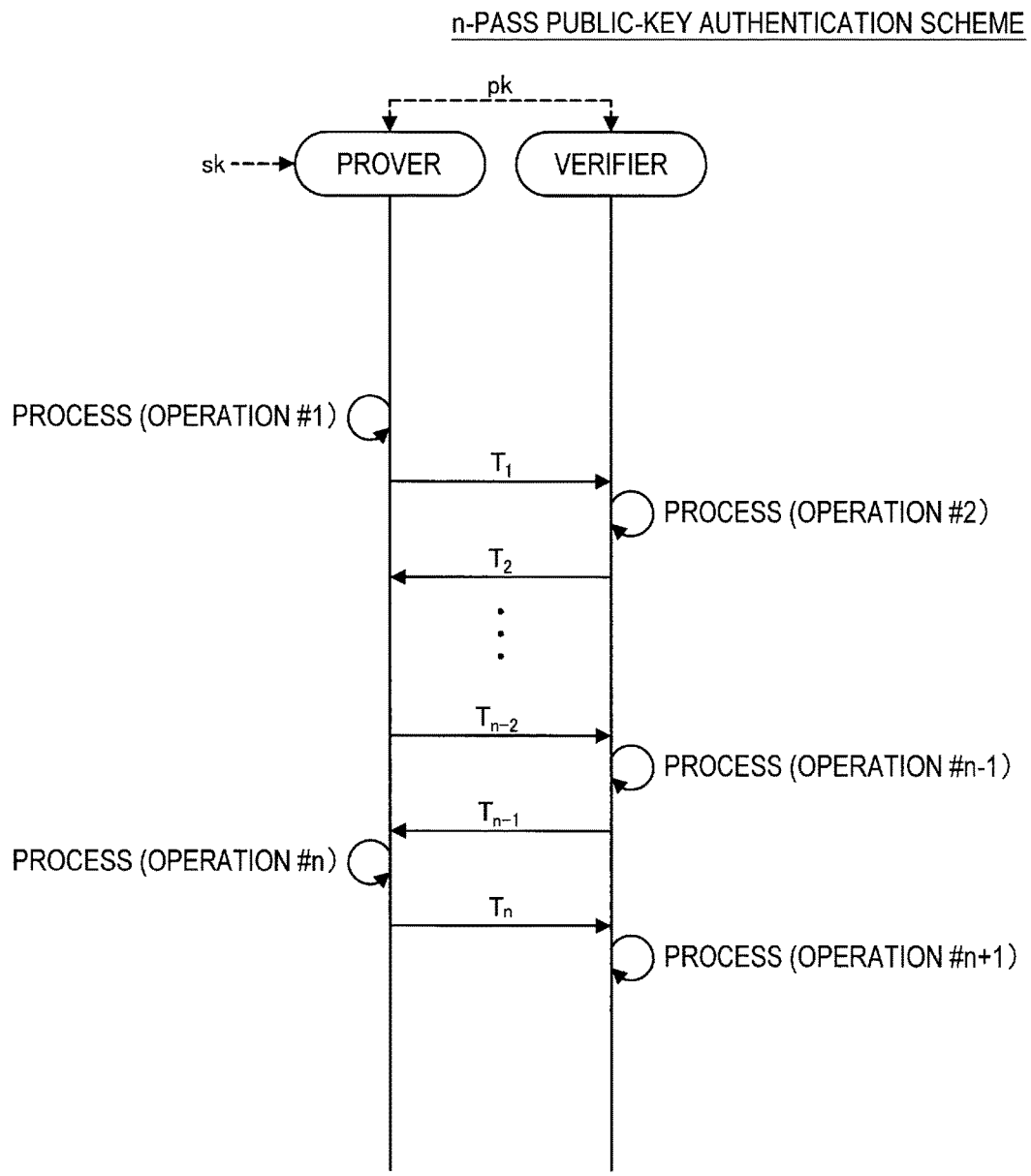

[Fig. 4]
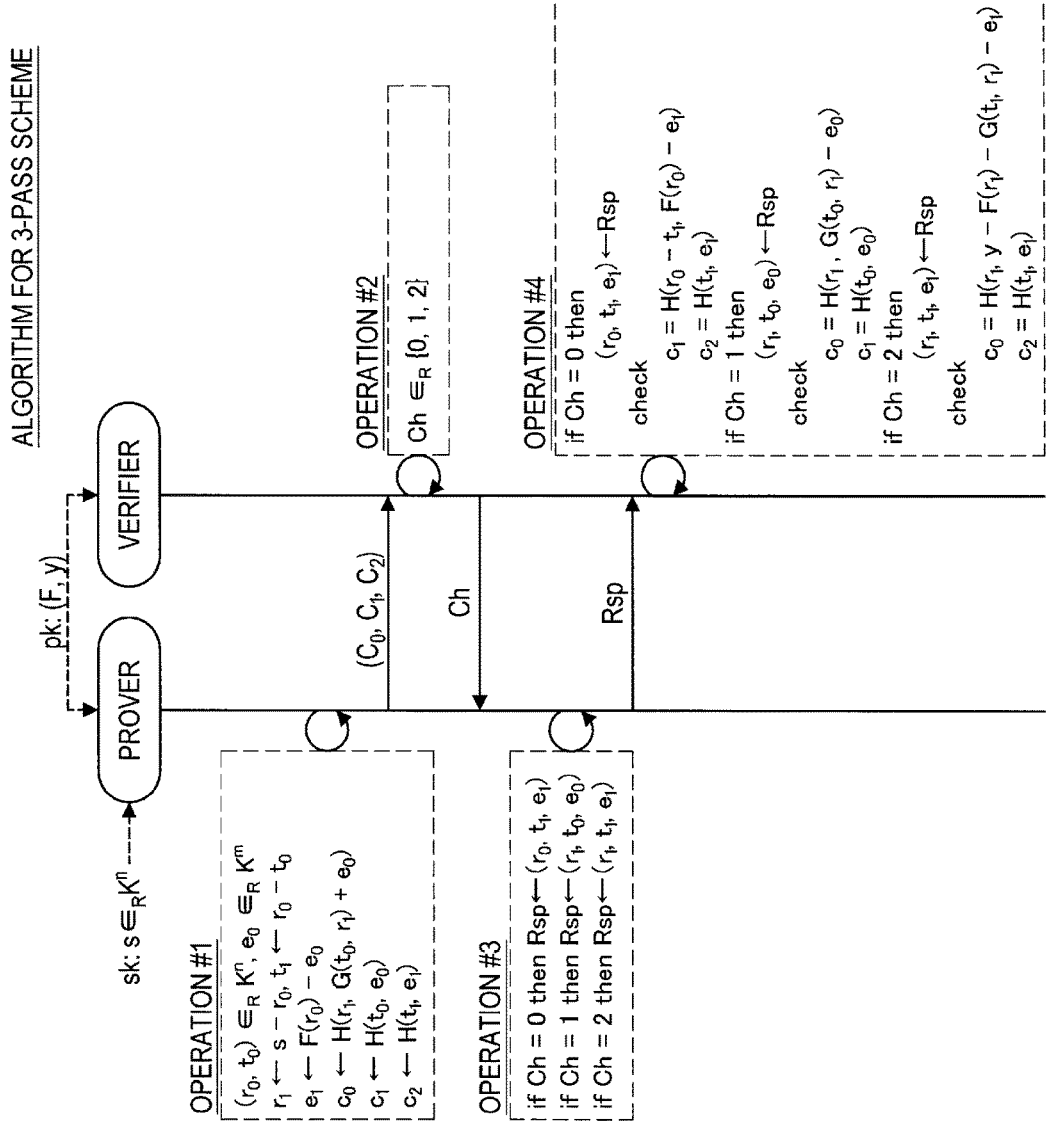

[Fig. 5]
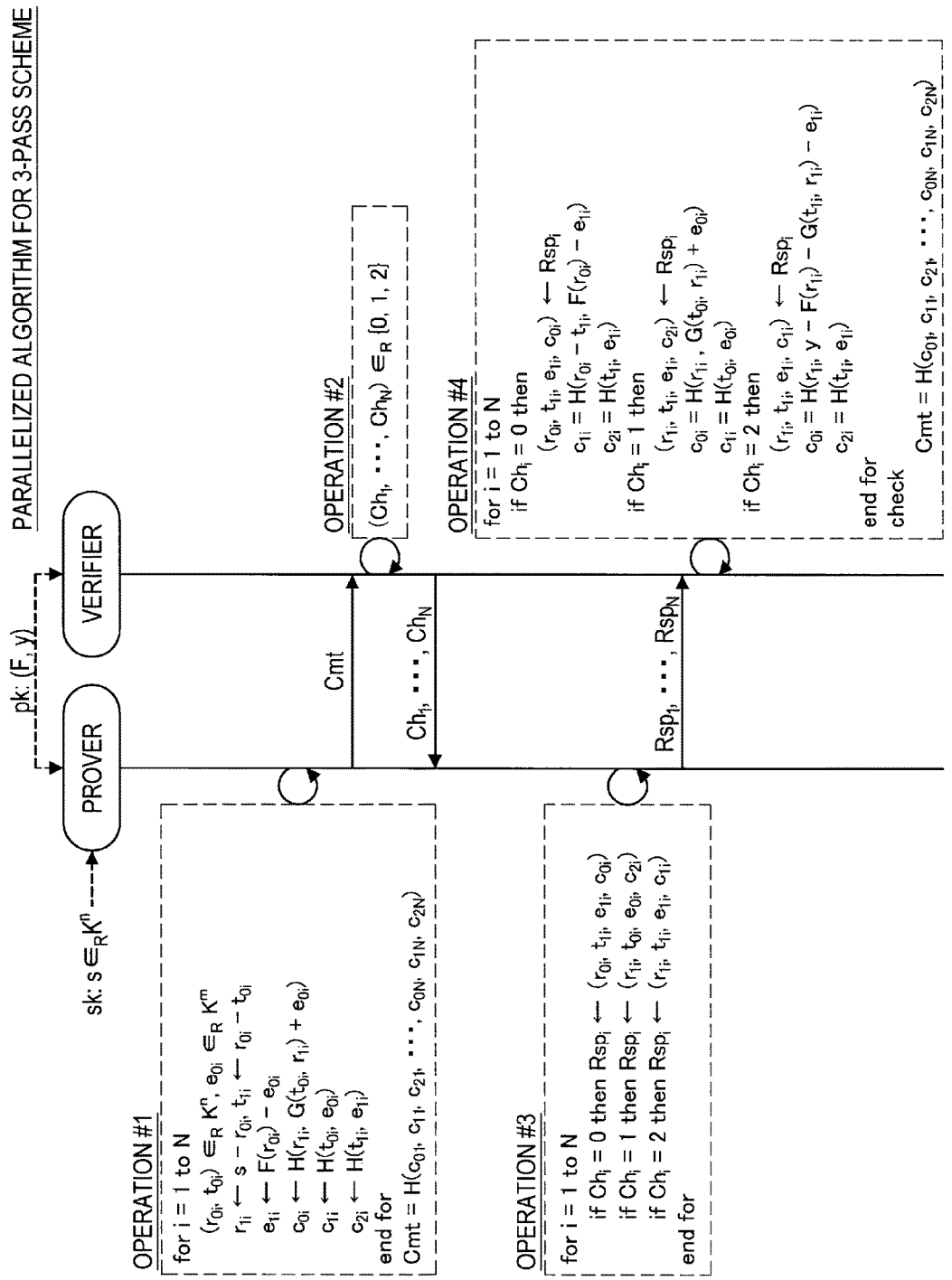

[Fig. 6]
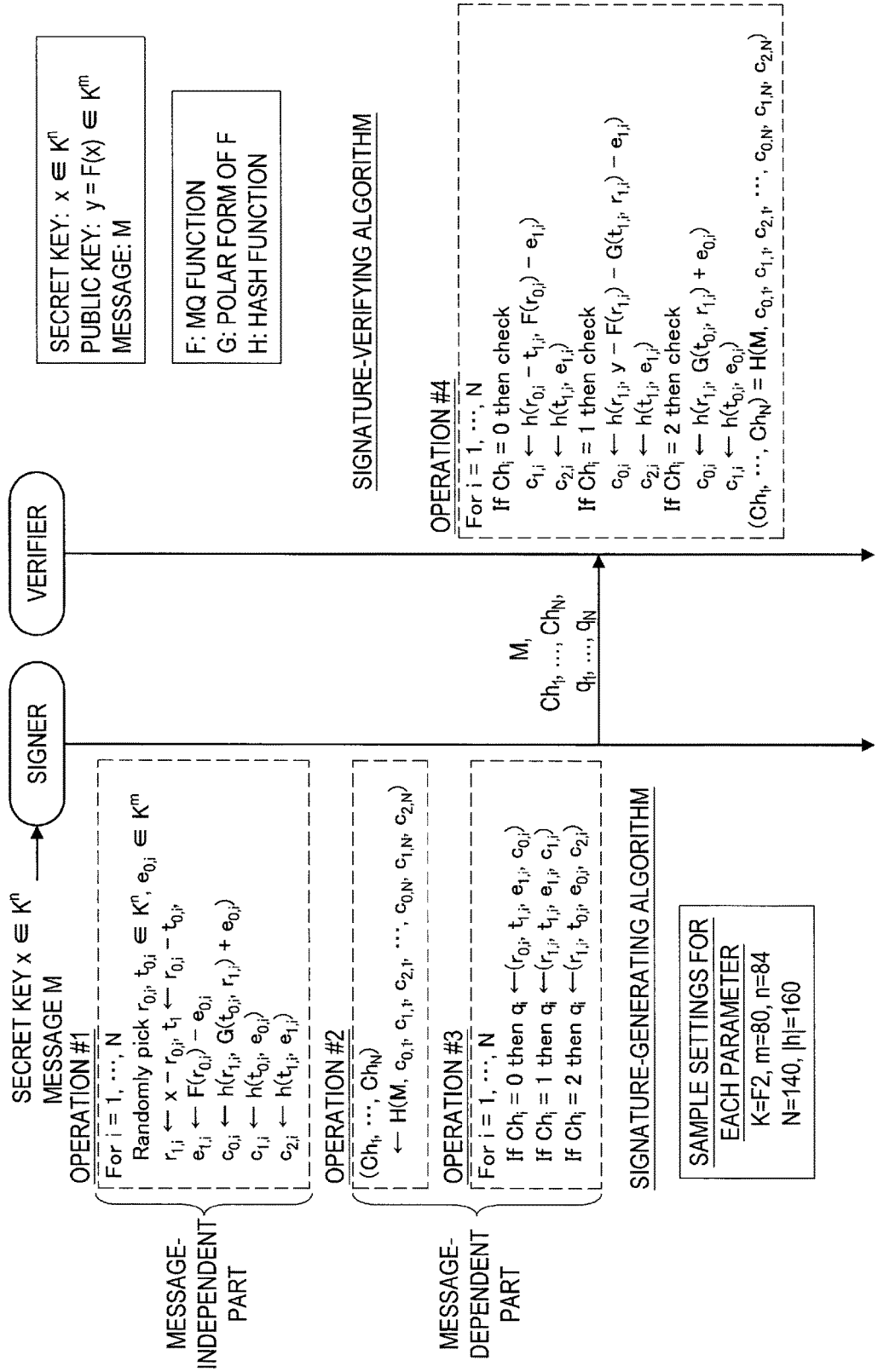

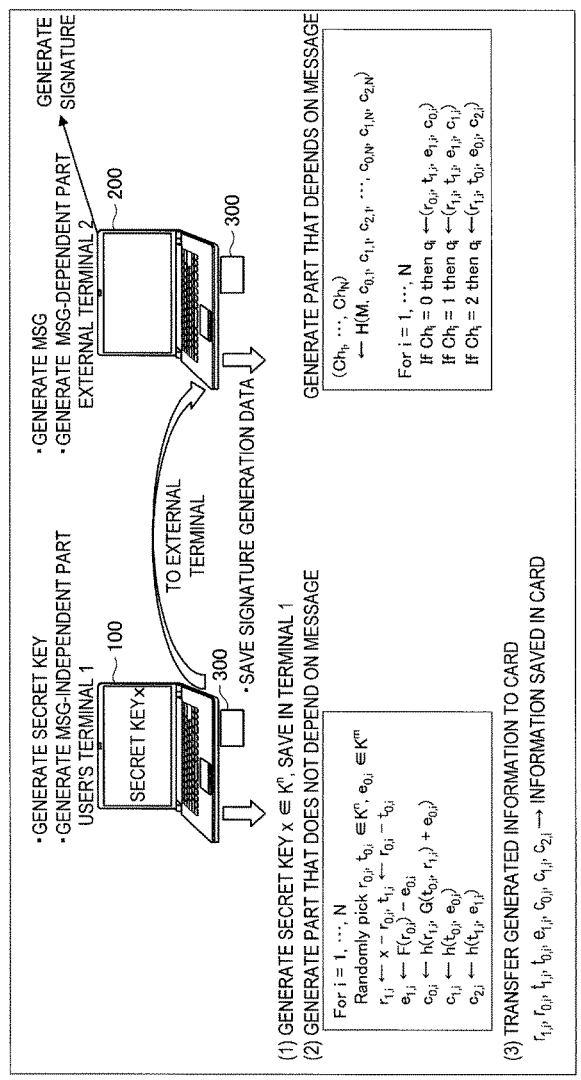

[Fig. 8]
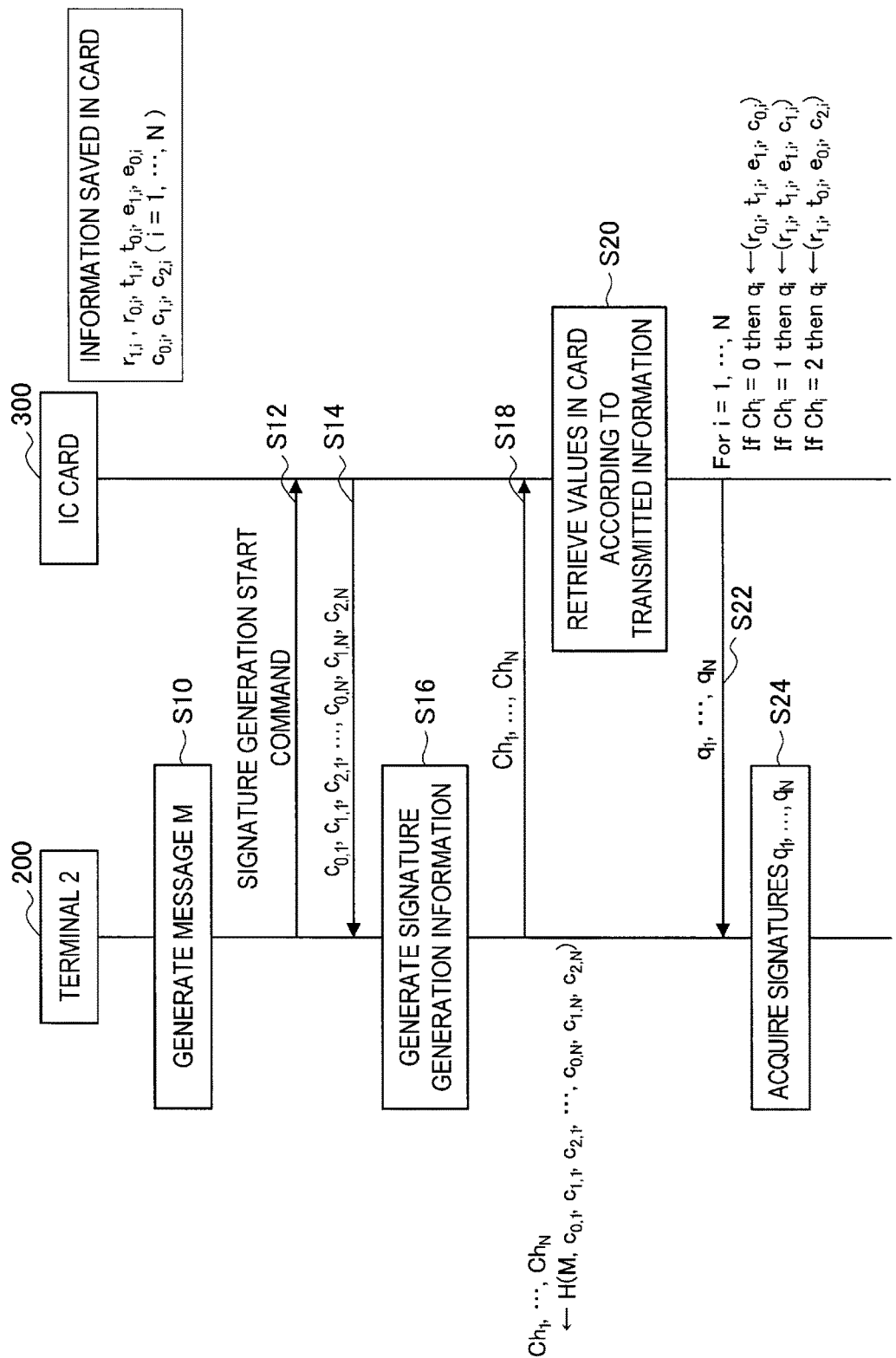

[Fig. 9]
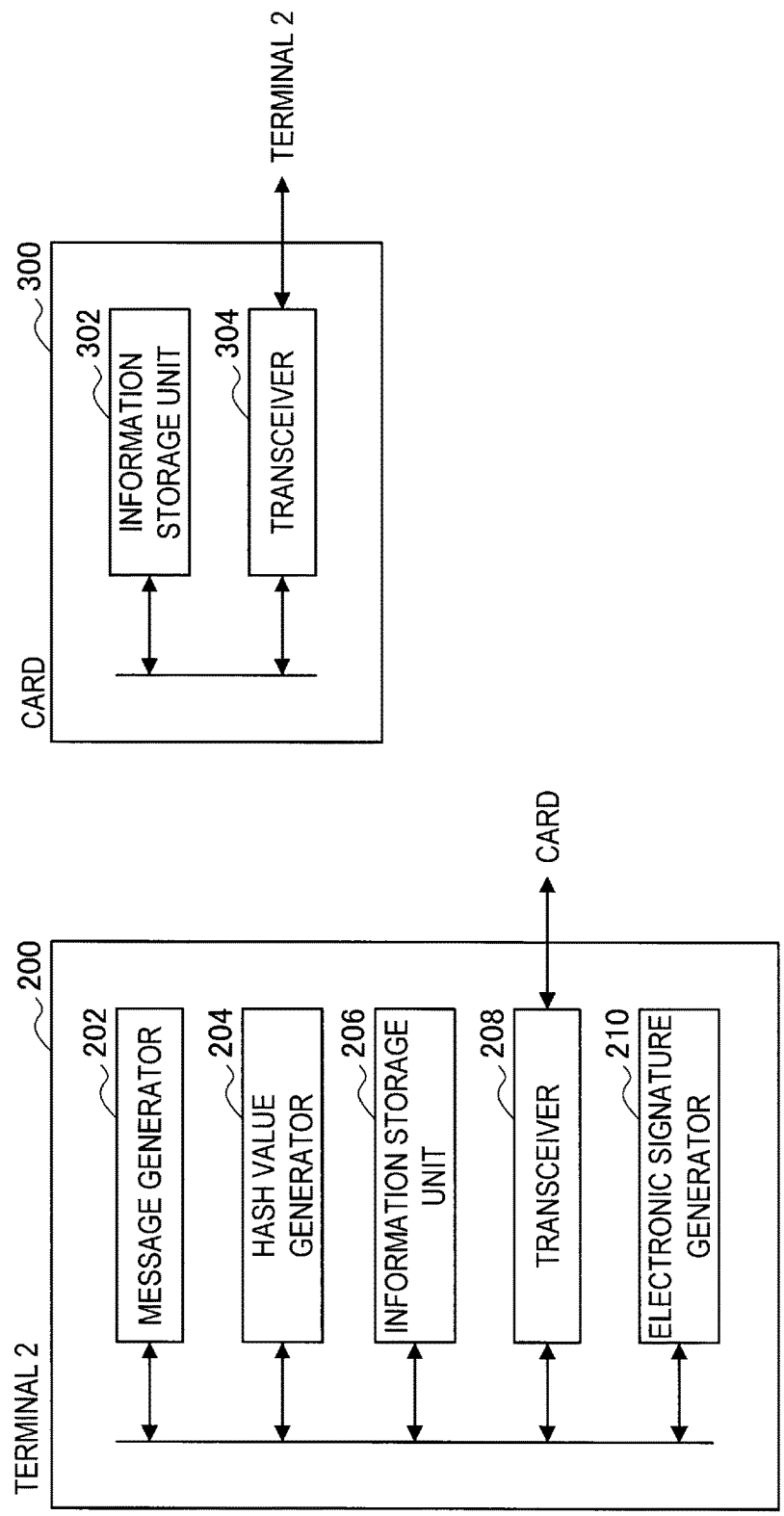

[Fig. 10]
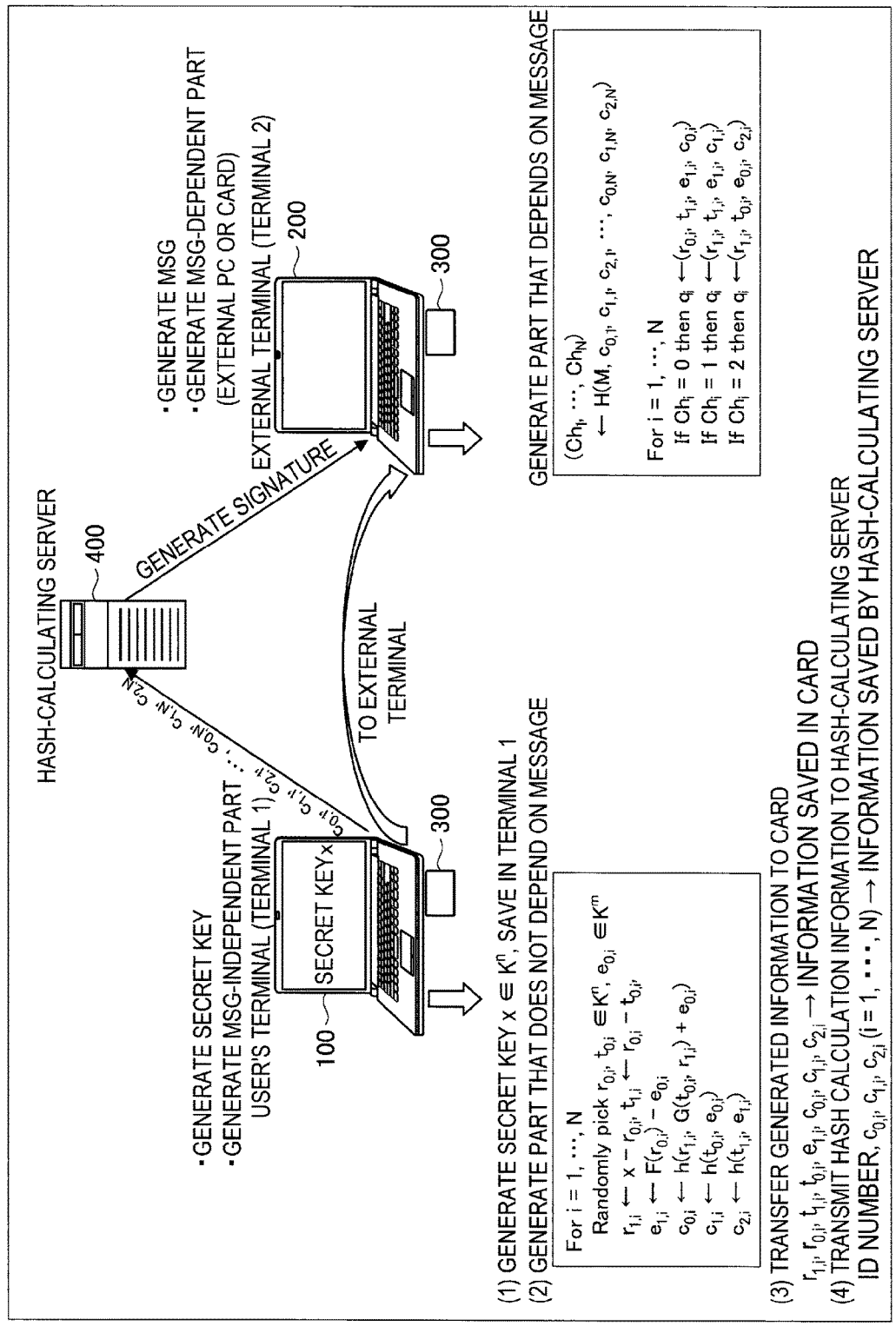

[Fig. 11]
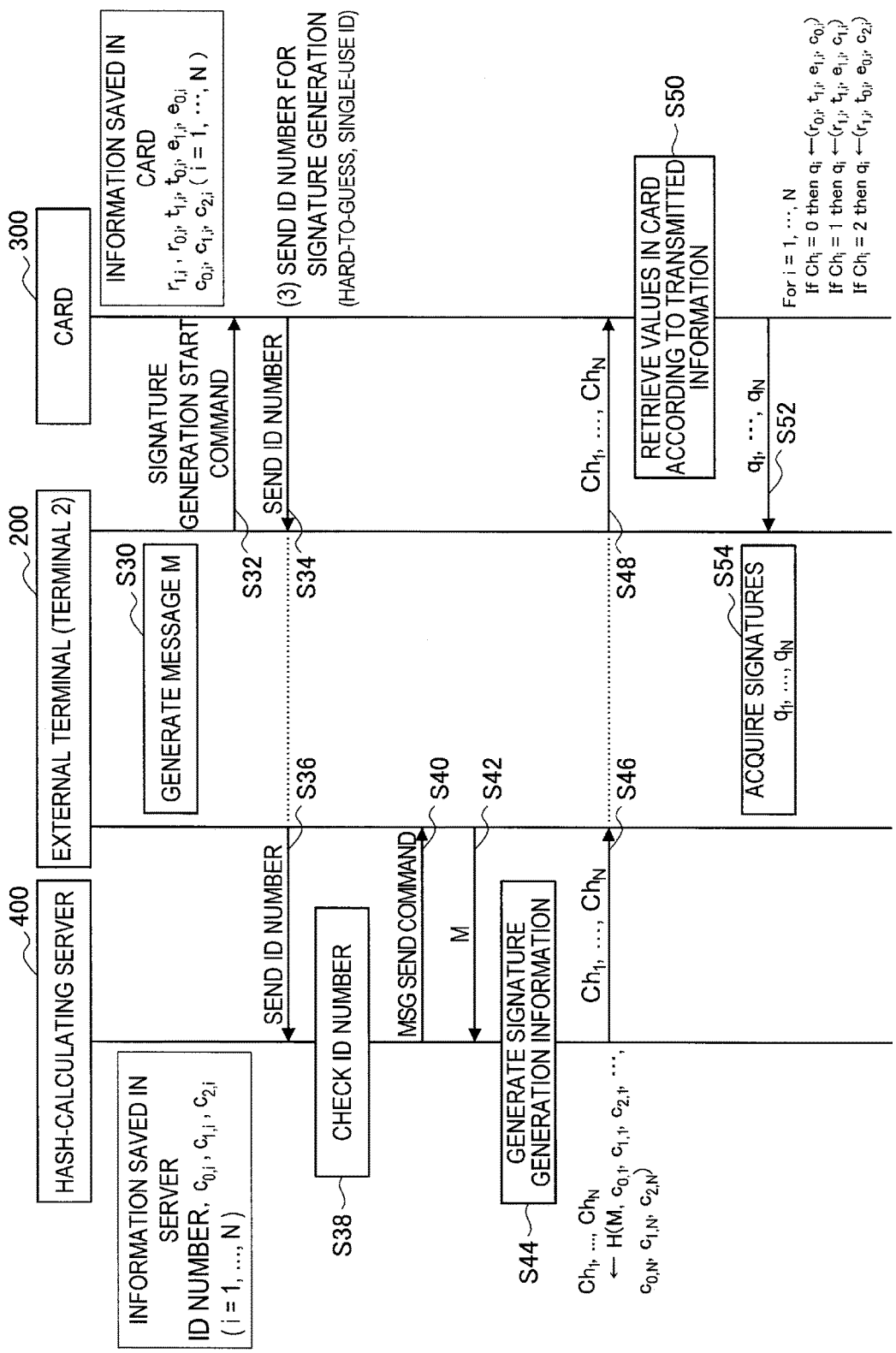

[Fig. 12]
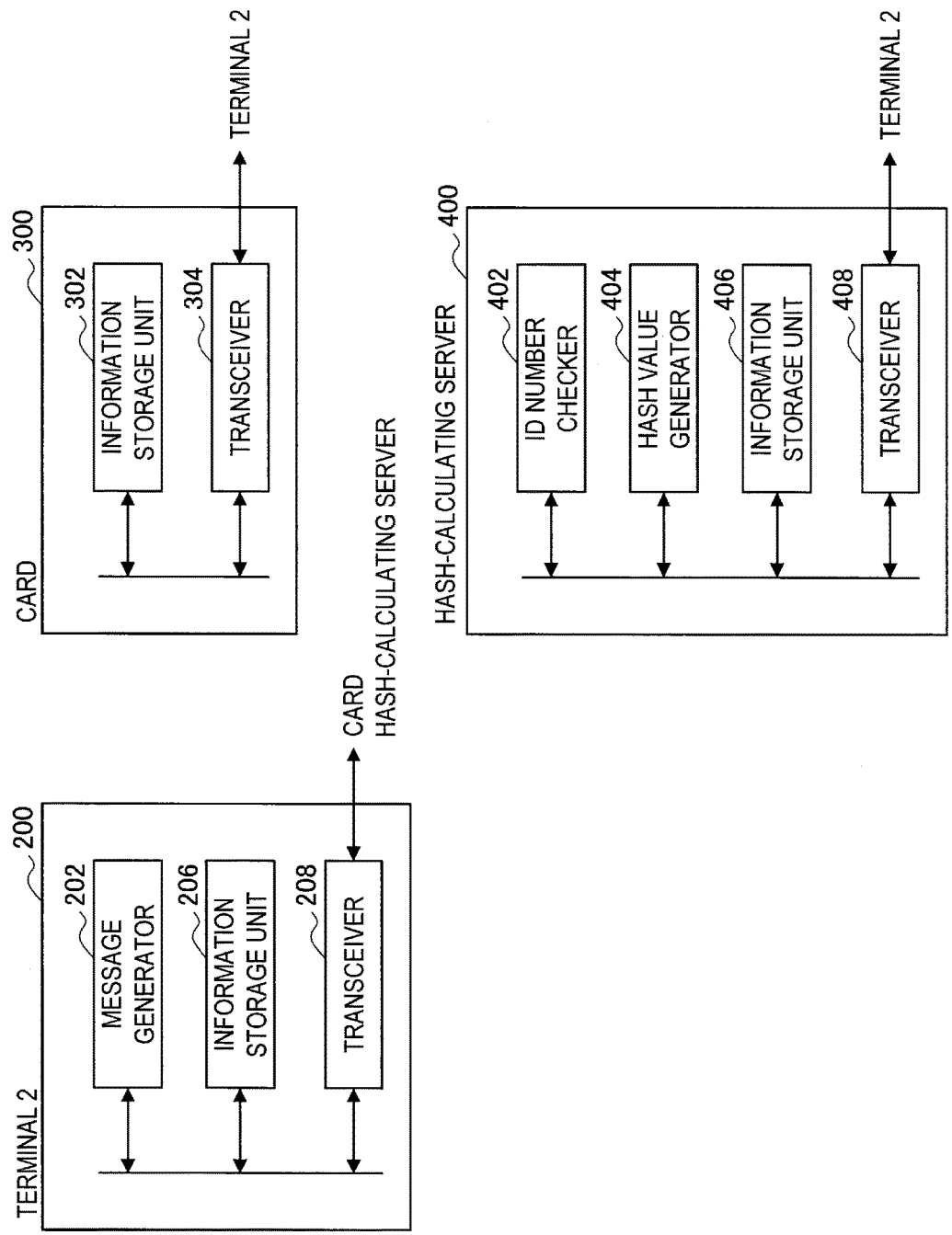

[Fig. 13]
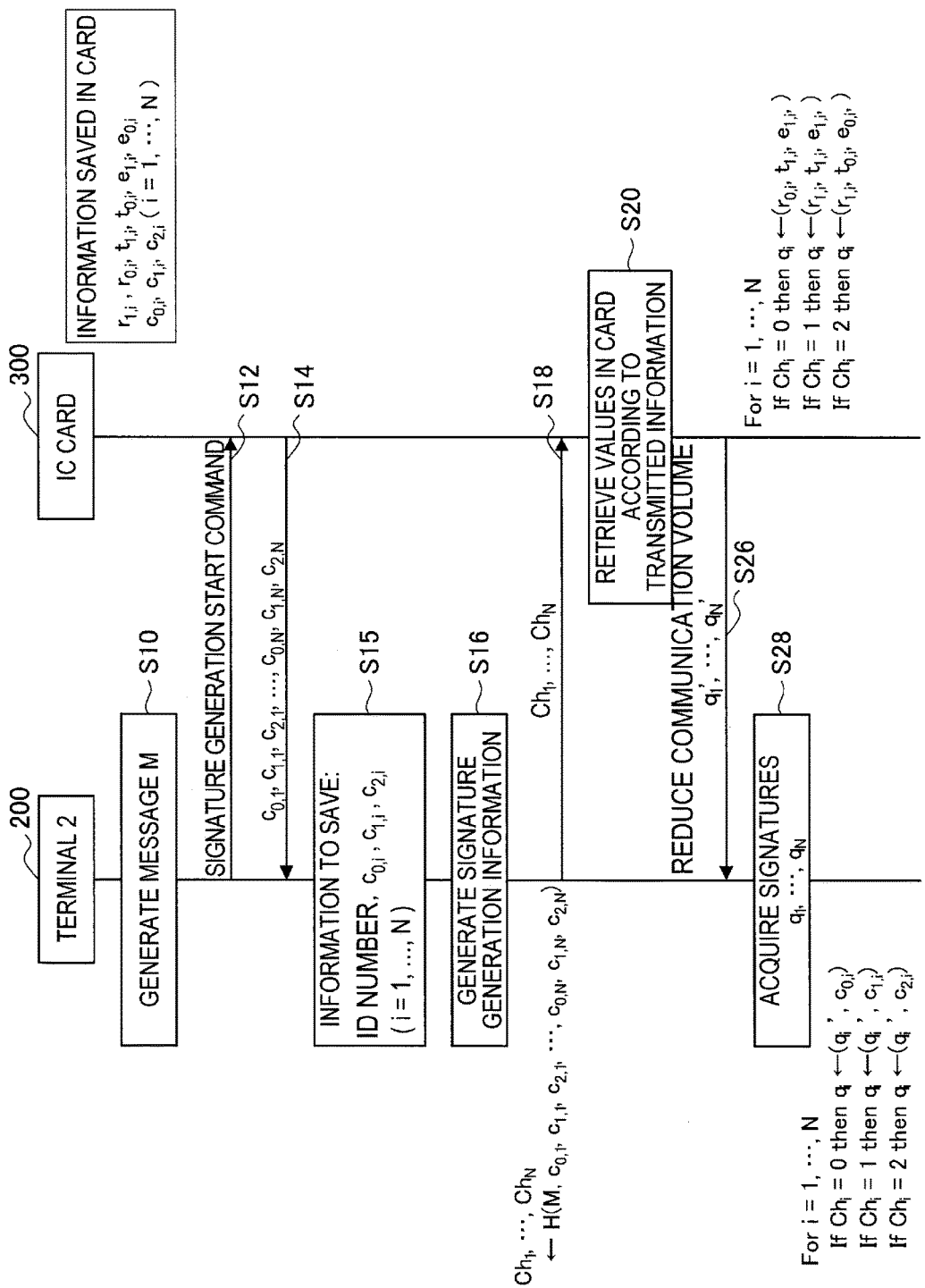

[Fig. 14]
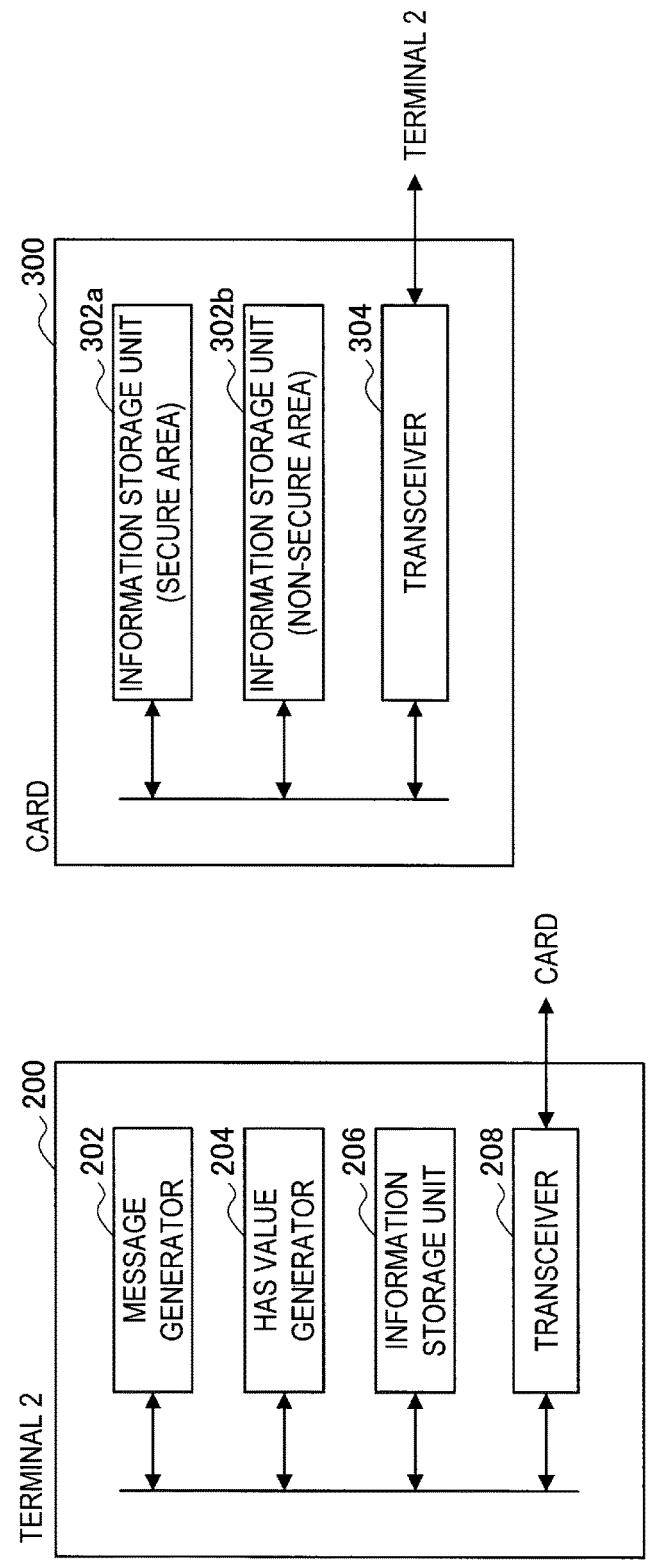

[Fig. 15]
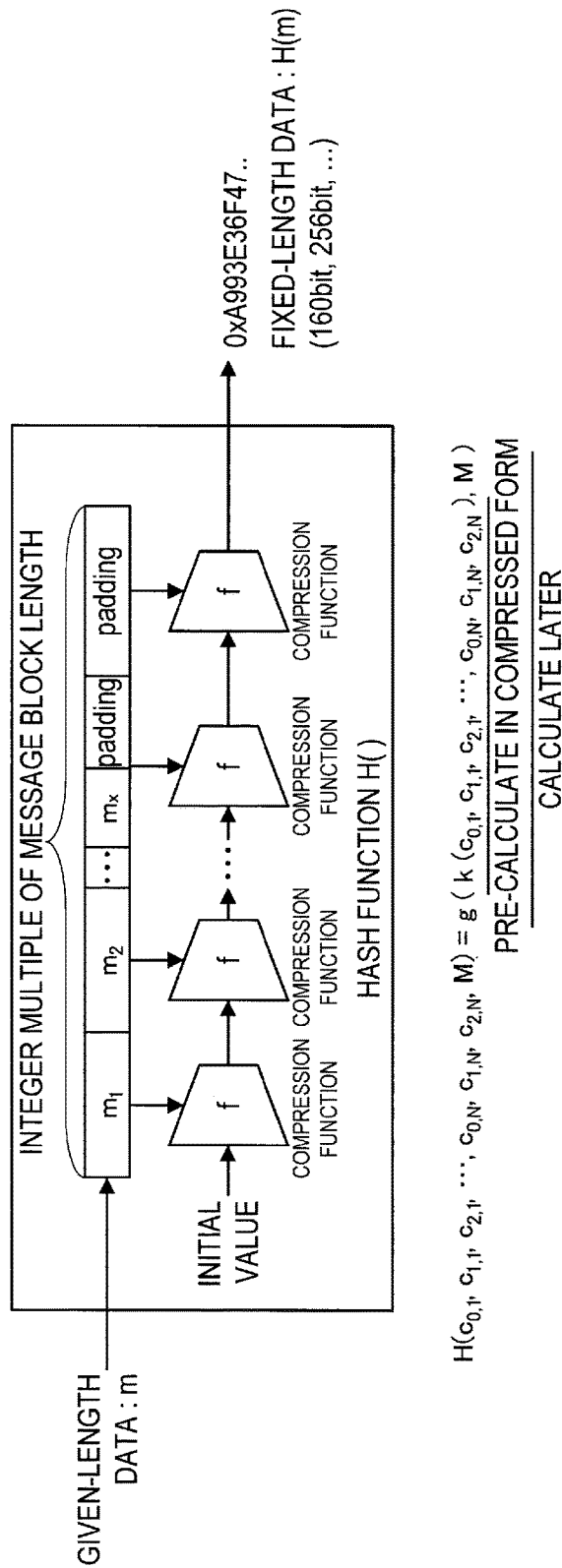

[Fig. 16]
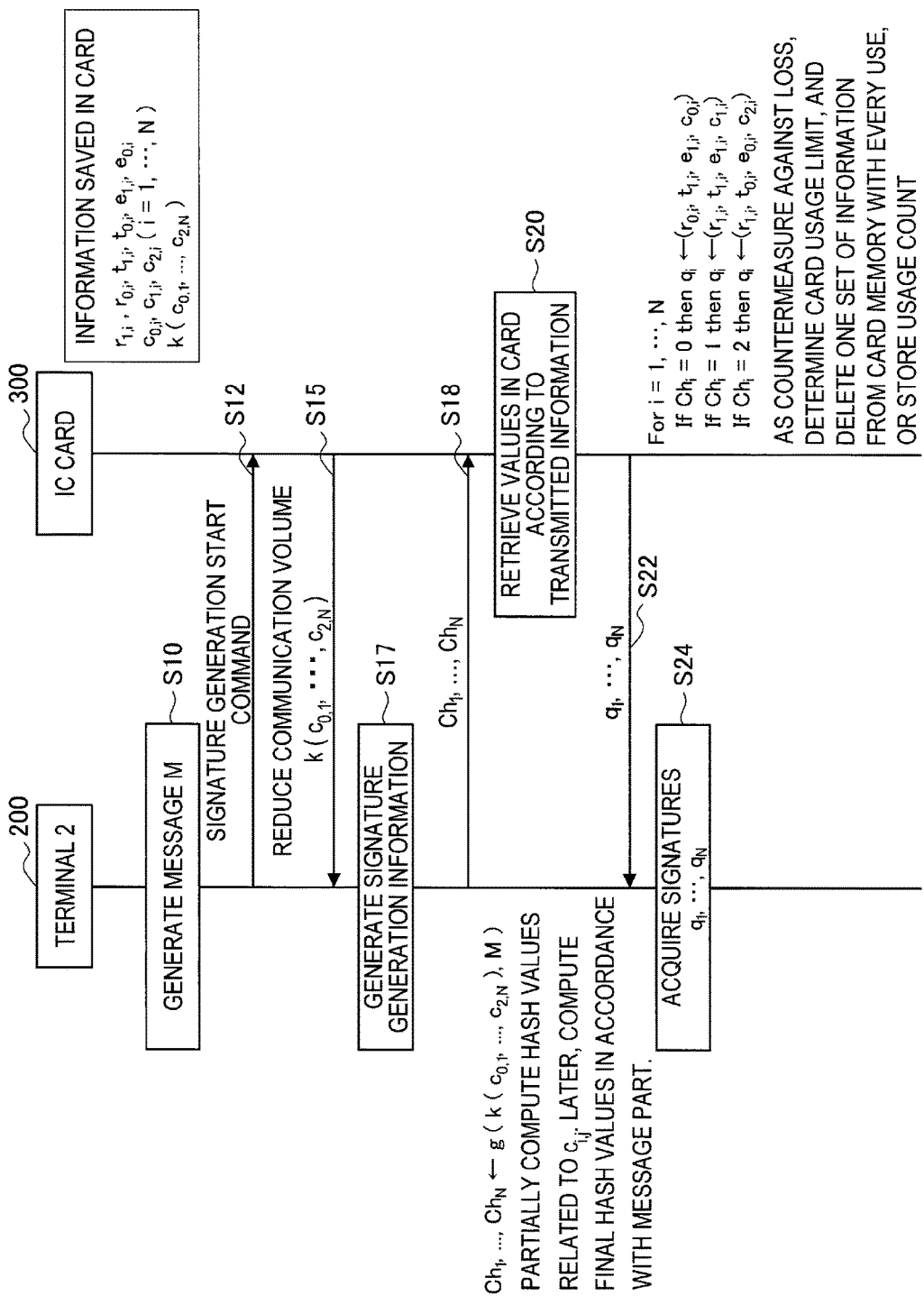

[Fig. 17]
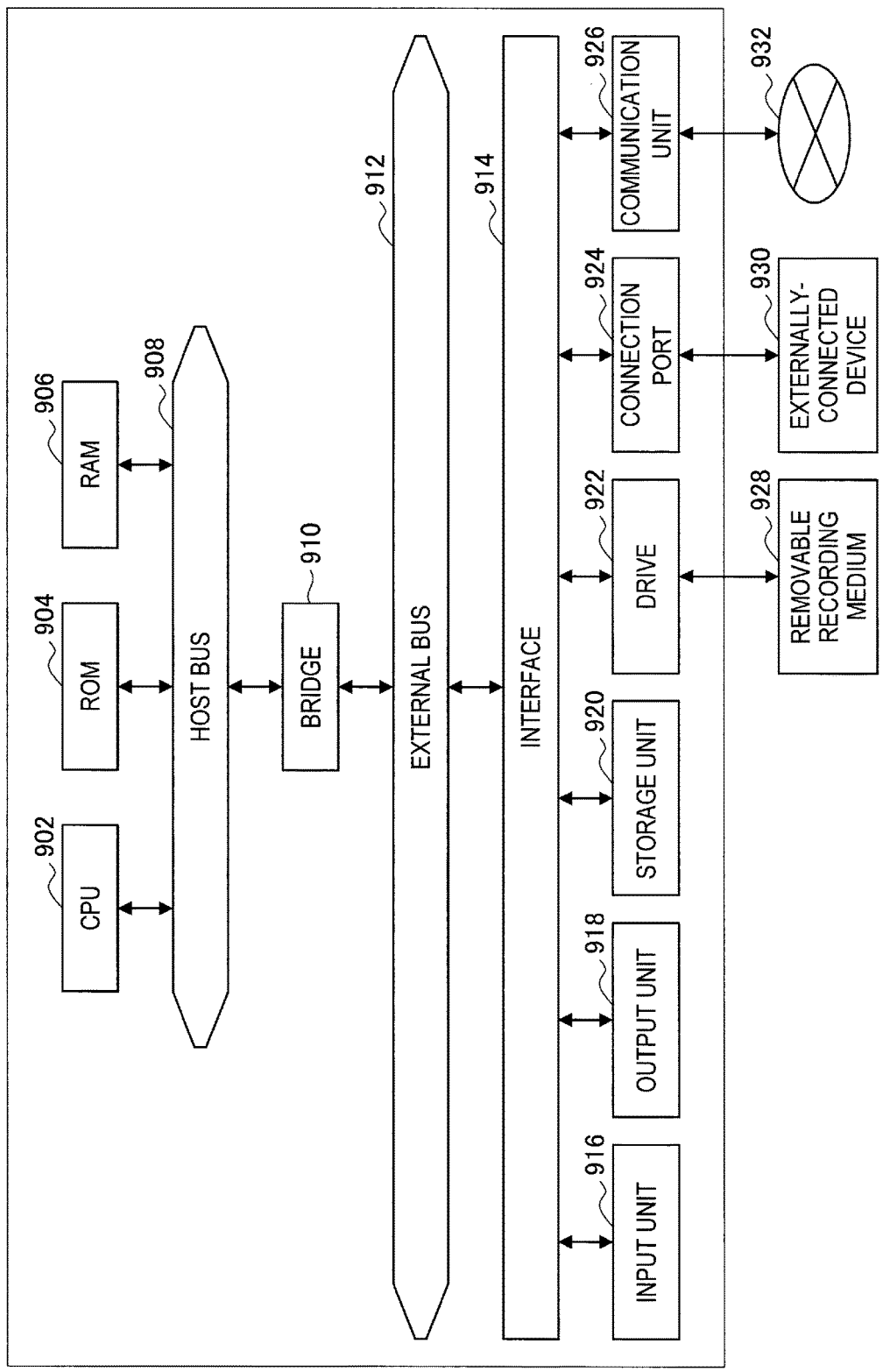

AUTHENTICATION USING ELECTRONIC SIGNATURE

TECHNICAL FIELD

The present disclosure relates to an information processing apparatus, an information processing system, an information processing method, and a program.

The present disclosure contains subject matter related to that disclosed in Japanese Priority Patent Application JP 2012-190446 filed in the Japan Patent Office on Aug. 30, 2012, the entire content of which is hereby incorporated by reference.

BACKGROUND ART

Technology that adds electronic signatures to information such as documents and message is now being widely used. When adding a signature using an external terminal, the user may use an IC card so as to not enter the secret key of his or her electronic signature into the external terminal. For example, as described in PTL 1 below, there exists technology that generates an electronic signature in an IC card by using a public-key cryptography function such as RSA.

CITATION LIST

Patent Literature

PTL 1: JP 2902087B

SUMMARY

Technical Problem

However, electronic signature processes use computations related to public-key cryptography, and since processing public-key cryptography functions are typically compute-intensive, conducting such functions on an IC card with limited processing capabilities is difficult. For this reason, a more capable CPU may be provided on-board in the case of processing such functions on in IC card, but this is problematic in that manufacturing costs rise. Also, generating an electronic signature on an IC card also creates the problem of time-consuming signature generation due to the large processing load.

Thus, it is desirable to minimize the processing load when generating an electronic signature using an IC card.

Solution to Problem

According to an embodiment of the present disclosure, there is provided an information processing system including, interface circuitry configured to receive message-independent information, the message-independent information having been generated by another apparatus and transferred to the interface in advance of a digital signature being generated, send message-dependent information to an external device, and receive a digital signature from the external device; and processing circuitry configured to generate the message-dependent information from a message and at least a part of the message-independent information, and associate the digital signature with the message.

Advantageous Effects of Invention

According to the embodiments of the present disclosure described above, minimizing the processing load when generating an electronic signature using an IC card becomes possible.

BRIEF DESCRIPTION OF DRAWINGS

FIG. 1 is a schematic diagram summarizing algorithms for a public-key authentication scheme.

FIG. 2 is a schematic diagram summarizing algorithms for an electronic signature scheme.

FIG. 3 is an explanatory diagram illustrating an n-pass public-key authentication scheme.

FIG. 4 is a diagram illustrating specific algorithm structures related to a 3-pass scheme.

FIG. 5 is a schematic diagram illustrating a method of parallelizing the algorithms for the 3-pass scheme illustrated in FIG. 4.

FIG. 6 is a schematic diagram illustrating a modification from a 3-pass public-key authentication scheme to an electronic signature scheme.

FIG. 7 is a schematic diagram summarizing a system according to the first embodiment.

FIG. 8 is a sequence diagram illustrating a process that generates information for a message-dependent part.

FIG. 9 is a function block diagram illustrating a configuration of the first embodiment.

FIG. 10 is a schematic diagram summarizing a system according to the second embodiment.

FIG. 11 is a sequence diagram illustrating a process according to the second embodiment.

FIG. 12 is a function block diagram illustrating a configuration of the second embodiment.

FIG. 13 is a schematic diagram illustrating a modification of the first embodiment.

FIG. 14 is a function block diagram illustrating a configuration of the third embodiment.

FIG. 15 is a schematic diagram illustrating an MD hash function (Merkle-Damgard construction).

FIG. 16 is a sequence diagram illustrating a process according to the fourth embodiment.

FIG. 17 is a schematic diagram illustrating a hardware configuration of an information processing apparatus.

DESCRIPTION OF EMBODIMENTS

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

(Flow of Description)

The flow of the description regarding the embodiments of the present technology described hereinafter will be now briefly discussed. First, an algorithm structure for a public-key authentication scheme will be described with reference to FIG. 1. Next, an algorithm structure for an electronic signature scheme will be described with reference to FIG. 2. Next, an n-pass public-key authentication scheme will be described with reference to FIG. 3.

Next, an example of algorithm structures related to a 3-pass public-key authentication scheme will be described with reference to FIGS. 4 and 5. Next, the first through fourth embodiments of the present disclosure will be described with reference to FIGS. 7 to 16. Next, an exemplary hardware configuration of an information processing apparatus capable of realizing the respective algorithms according to the embodiment of the present technology will be described with reference to FIG. 17.

(Table of Contents)
1. Introduction
1-1. Algorithm for public-key authentication scheme
1-2. Algorithm for electronic signature scheme
1-3. N-pass public-key authentication scheme
2. Algorithm structures related to 3-pass public-key authentication scheme
2-1. Example of specific algorithm structures
2-2. Example of parallelized algorithm structures
3. Modification to electronic signature scheme
3-1. Modification from 3-pass public-key authentication scheme to electronic signature scheme
4. First embodiment
4-1. Conclusion of system according to first embodiment
4-2. Process by system according to first embodiment
4-3. Exemplary configuration of system according to first embodiment
4-4. Modification of first embodiment
5. Second embodiment
5-1. Conclusion of system according to second embodiment
5-2. Process by system according to second embodiment
5-3. Exemplary configuration of system according to second embodiment
6. Third embodiment
6-1. Conclusion of system according to third embodiment
6-2. Exemplary configuration of system according to third embodiment
7. Fourth embodiment
7-1. Conclusion of system according to fourth embodiment
7-2. Process by system according to fourth embodiment
7-3. Exemplary configuration of system according to fourth embodiment
8. Authentication protocol
9. Exemplary hardware configuration
1. Introduction The embodiments herein relate to a public-key authentication scheme and an electronic signature scheme that base their safety on the difficulty of solving high-order, multivariate systems of equations. However, the embodiments herein differ from techniques of the related art such as HFE electronic signature schemes, and relate to a public-key authentication scheme and an electronic signature scheme that utilize high-order, multivariate systems of equations that lack a means of efficient solving (trapdoors). First, algorithms for a public-key authentication scheme, algorithms for an electronic signature scheme, and an n-pass public-key authentication scheme will be briefly summarized.

1-1. Algorithms for Public-Key Authentication Scheme

First, algorithms for a public-key authentication scheme will be summarized with reference to FIG. 1. FIG. 1 is an explanatory diagram algorithms for public-key authentication scheme.

Public-key authentication is used in order for a certain person (the prover, also referred to as Alice) to convince another person (the verifier, also referred to as Bob) that she is herself by using a public key pk and a secret key sk. For example, Alice's public key $pk_A$ is disclosed to Bob. On the other hand, Alice keeps her secret key $sk_A$ a secret. In the public-key authentication setup, it is assumed that Alice herself is the person who knows the secret key $sk_A$ corresponding to the public key $pk_A$.

In order for Alice to prove to Bob that she is Alice herself using the public-key authentication setup, Alice, via a session protocol, presents proof to Bob indicating that she knows the secret key $sk_A$ corresponding to the public key $pk_A$. The proof indicating the Alice knows the secret key $sk_A$ is then presented to Bob, and in the case where Bob is able to confirm that proof, the validity of Alice (the fact that Alice is herself) is proven.

However, a public-key authentication setup demands the following conditions in order to ensure safety.

The first condition is that a forger who does not possess the secret key sk when executing the session protocol has a vanishingly small probability of creating a forgery. Upholding the first condition is called "soundness". In other words, soundness may be restated as: "a forger lacking a secret key sk has a negligible chance of establishing a forgery during the session protocol." The second condition is that no information about Alice's secret key $sk_A$ is divulged to Bob, even if executing the session protocol. Upholding the second condition is called "zero-knowledge".

Conducting public-key authentication safely involves using a session protocol exhibiting both soundness and zero-knowledge. If an authentication process were hypothetically conducted using a session protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

As illustrated in FIG. 1, the two identities of prover and verifier exist in a model of a public-key authentication scheme. The prover uses a key-generating algorithm Gen to generate a paired secret key sk and public key pk unique to the prover. Subsequently, the prover uses the paired secret key sk and public key pk generated using the key-generating algorithm Gen to execute a session protocol with a verifier. At this point, the prover executes the session protocol by using a prover algorithm P. As above, the prover uses the prover algorithm P to present proof that she possesses the secret key sk to the verifier during the session protocol.

Meanwhile, the verifier executes the session protocol using a verifier algorithm V, and verifies whether or not the prover possesses the secret key corresponding to the public key made public by that prover. In other words, the verifier is an entity that verifies whether or not the prover possesses the secret key that corresponds to the public key. In this way, the model of a public-key authentication scheme is made up of the two entities of the verifier and the prover, and the three algorithms of the key-generating algorithm Gen, the prover algorithm P, and the verifier algorithm V.

Note that although the terms "prover" and "verifier" are used in the description hereinafter, these terms ultimately mean entities. Consequently, the agent that executes the key-generating algorithm Gen and the prover algorithm P is an information processing apparatus corresponding to the "prover" entity. Similarly, the agent that executes the verifier algorithm V is an information processing apparatus. The hardware configuration of these information processing apparatus is as illustrated in FIG. 17, for example. In other words, the key-generating algorithm Gen, the prover algorithm P, and the verifier algorithm V are executed by processing circuitry using a device such as a CPU 902 on the basis of a program recorded onto a device such as ROM 904, RAM 906, a storage unit 920, or a removable medium 928.

(Key-Generating Algorithm Gen)

The key-generating algorithm Gen is used by the prover. The key-generating algorithm Gen is an algorithm that generates a paired secret key sk and public key pk unique to the prover. The public key pk generated by the key-generating algorithm Gen is made public. The public key pk thus made public is then used by the verifier. Meanwhile, the prover keeps the secret key sk generated by the key-generating algorithm Gen a secret. The secret key sk kept secret by the prover is then used to prove to the verifier that the prover possesses the secret key sk corresponding to the public key pk. Formally, the key-generating algorithm Gen is expressed as an algorithm like the following Eq. 1, which accepts a security parameter $1^p$ (where p is an integer equal to or greater than 0) as input, and outputs a secret key sk and a public key pk.

[Math.1]

$$(sk, pk) \leftarrow Gen(1^p) \quad (1)$$

(Prover Algorithm P)

The prover algorithm P is used by the prover. The prover algorithm P is an algorithm for proving to the verifier that the prover possesses the secret key sk corresponding to the public key pk. In other words, the prover algorithm P is an algorithm that accepts a secret key sk and a public key pk as input, and executes a session protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following Eq. 2.

[Math.2]

$$0/1 \leftarrow V(pk) \quad (2)$$

As above, realizing meaningful public-key authentication involves having the session protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key-generating algorithm Gen, prover algorithm P, and verifier algorithm V are skillfully designed to satisfy these requirements.

The foregoing thus summarizes the algorithms in a public-key authentication scheme.

1-2. Algorithms for Electronic Signature Scheme

Next, algorithms for an electronic signature scheme will be summarized with reference to FIG. 2. FIG. 2 is an explanatory diagram summarizing algorithms for an electronic signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is electronic signatures. An electronic signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of an electronic signature scheme. In addition, the model of an electronic signature scheme is made up of three algorithms: a key-generating algorithm Gen, a signature-generating algorithm Sig, and a signature-verifying algorithm Ver.

The signer uses the key-generating algorithm Gen to generate a paired signature key sk and verification key pk unique to the signer. The signer also uses the signature-generating algorithm Sig to generate an electronic signature q to attach to a message M. In other words, the signer is an entity that attaches an electronic signature to a message M. Meanwhile, the verifier uses the signature-verifying algorithm Ver to verify the electronic signature attached to the message M. In other words, the verifier is an entity that verifies the electronic signature q in order to confirm whether or not the creator of the message M is the signer.

Note that although the terms "signer" and "verifier" are used in the description hereinafter, these terms ultimately mean entities. Consequently, the agent that executes the key-generating algorithm Gen and the signature-generating algorithm Sig is an information processing apparatus corresponding to the "signer" entity. Similarly, the agent that executes the signature-verifying algorithm Ver is an information processing apparatus. The hardware configuration of these information processing apparatus is as illustrated in FIG. 17, for example. In other words, the key-generating algorithm Gen, the signature-generating algorithm Sig, and the signature-verifying algorithm Ver are executed by a device such as a CPU 902 on the basis of a program recorded onto a device such as ROM 904, RAM 906, a storage unit 920, or a removable medium 928.

(Key-Generating Algorithm Gen)

The key-generating algorithm Gen is used by the signer. The key-generating algorithm Gen is an algorithm that generates a paired signature key sk and verification key pk unique to the signer. The verification key pk generated by the key-generating algorithm Gen is made public. Meanwhile, the signer keeps the signature key sk generated by the key-generating algorithm Gen a secret. The signature key sk is then used to generate electronic signature q to attach to a message M. For example, the key-generating algorithm Gen accepts a security parameter $1^p$ (where p is an integer equal to or greater than 0) as input, and outputs a signature key sk and a verification key pk. In this case, the key-generating algorithm Gen may be expressed formally as in the following Eq. 3.

[Math.3]

$$(sk, pk) \leftarrow Gen(1^p) \quad (3)$$

(Signature-Generating Algorithm Sig)

The signature-generating algorithm Sig is used by the signer. The signature-generating algorithm Sig is an algorithm that generates an electronic signature q to be attached to a message M. The signature-generating algorithm Sig is an algorithm that accepts a signature key sk and a message M as input, and outputs an electronic signature q. The signature-generating algorithm Sig may be expressed formally as in the following Eq. 4.

[Math.4]

$$q \leftarrow Sig(sk, M) \quad (4)$$

(Signature-Verifying Algorithm Ver)

The signature-verifying algorithm Ver is used by the verifier. The signature-verifying algorithm Ver is an algorithm that verifies whether or not the electronic signature q is a valid electronic signature for the message M. The signature-verifying algorithm Ver is an algorithm that accepts a signer's verification key pk, a message M, and an electronic signature q as input, and outputs 0 or 1 (1 bit). The signature-verifying algorithm Ver may be expressed formally as in the following Eq. 5. At this point, the verifier decides that the electronic signature q is invalid in the case where the signature-verifying algorithm Ver outputs 0 (the case where the verification key pk rejects the message M and the electronic signature q), and decides that the electronic signature q is valid in the case where the signature-verifying algorithm Ver outputs 1 (the case where the verification key pk accepts the message M and the electronic signature q).

[Math.5]

$$0/1 \leftarrow Ver(pk, M, q) \quad (5)$$

The foregoing thus summarizes the algorithms in an electronic signature scheme.

1-3. N-Pass Public-Key Authentication Scheme

Next, an n-pass public-key authentication scheme will be described with reference to FIG. 3. FIG. 3 is an explanatory diagram illustrating an n-pass public-key authentication scheme.

As above, a public-key authentication scheme is an authentication scheme that proves to a verifier that a prover possesses a secret key sk corresponding to a public key pk during a session protocol. In addition, the session protocol has to satisfy the two conditions of soundness and zero-knowledge. For this reason, during the session protocol both the prover and the verifier exchange information n times while executing respective processes, as illustrated in FIG. 3.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n, and lastly, a process (operation #n+1) is executed. Transmitting and receiving information n times in this way is thus called an "n-pass" public-key authentication scheme.

The foregoing thus describes an n-pass public-key authentication scheme.

2. Algorithm Structures Related to 3-Pass Public-Key Authentication Scheme

Hereinafter, algorithms related to a 3-pass public-key authentication scheme will be described. Note that in the following description, a 3-pass public-key authentication scheme may also be referred to as a "3-pass scheme" in some cases.

2-1. Example of Specific Algorithm Structures (FIG. 4)

First, an example of specific algorithm structures related to a 3-pass scheme will be introduced with reference to FIG. 4. FIG. 4 is a diagram illustrating specific algorithm structures related to a 3-pass scheme. At this point, consider the case of using a system of second-order polynomials $(f_1(x), \ldots, f_m(x))$ as part of a public key pk. However, assume that a second-order polynomial $f_i(x)$ is expressed as in the following Eq. 6. In addition, x will denote the vectors $(x_1, \ldots, x_n)$, and the multivariate polynomial F(x) will denote the system of second-order polynomials $(f_1(x), \ldots, f_m(x))$.

[Math.6]

$$f_i(x_1, \ldots, x_n) = \sum_{j,k} a_{ijk} x_j x_k + \sum_j b_{ij} x_j \quad (6)$$

The system of second-order polynomials $(f_1(x), \ldots, f_m(x))$ may also be expressed as in the following Eq. 7, where $A_1$ to $A_m$ are n×n matrices, and $b_1$ to $b_m$ are respective n×1 vectors.

[Math.7]

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \quad (7)$$

Using this expression, the multivariate polynomial F may be expressed as in the following Eq. 8 and 9. These expressions may be easily confirmed from Eq. 10 below.

[Math.8]

$$F(x+y) = F(x) + F(y) + G(x, y) \quad (8)$$

$$G(x, y) = \begin{pmatrix} y^T(A_1^T + A_1)x \\ \vdots \\ y^T(A_m^T + A_m)x \end{pmatrix} \quad (9)$$

$$\begin{aligned} f_i(x+y) &= (x+y)^T A_i(x+y) + b_i^T(x+y) \\ &= x^T A_i x + x^T A_i y + y^T A_i x + y^T A_i y + b_i^T x + b_i^T y \\ &= f_i(x) + f_i(y) + x^T A_i y + y^T A_i x \\ &= f_i(x) + f_i(y) + x^T (A_i^T)^T y + y^T A_i x \\ &= f_i(x) + f_i(y) + (A_i^T x)^T y + y^T A_i x \\ &= f_i(x) + f_i(y) + y^T (A_i^T x) + y^T A_i x \\ &= f_i(x) + f_i(y) + y^T (A_i^T + A_i) x \end{aligned} \quad (10)$$

When dividing F(x+y) into a first portion dependent on x, a second portion dependent on y, and a third portion dependent on both x and y in this way, the term G(x, y) corresponding to the third portion becomes bilinear with respect to x and y. Hereinafter, the term G(x, y) may be referred to as the bilinear term in some cases. Using this property enables the construction of an efficient algorithm.

For example, use the vector $t_0$ that is an element of the set $K^n$ and the vector $e_0$ that is an element of the set $K^m$ to express the multivariate polynomial $F^1(x)$, which is used to mask the multivariate polynomial F(x+r), as $F_1(x)=G(x, t_0)+e_0$. In this case, the sum of the multivariate polynomial $F(x+r_0)$ and G(x) is expressed as in Eq. 11 below. Provided that $t_1=r_0+t_0$ and $e_1=F(r_0)+e_0$, the multivariate polynomial $F_2(x)=F(x+r_0)+F_1(x)$ can be expressed by the vector $t_1$ that is an element of the set $K^n$ and the vector $e_1$ that is an element of the set $K^m$. For this reason, setting $F_1(x)=G(x, t_0)+e_0$ enables the expression of $F_1$ and $F_2$ using a vector in $K^n$ and a vector in $K^m$, making it possible to realize an efficient algorithm with a small data size for communication.

[Math.9]

$$F(x+r_0) + F_1(x) = F(x) + F(r_0) + G(x, r_0) + G(x, t_0) + e_0 \quad (11)$$
$$= F(x) + G(x, r_0 + t_0) + F(r_0) + e_0$$

Note that no information regarding $r_0$ is divulged from $F_2$ (or $F_1$). For example, even if $e_1$ and $t_1$ (or $e_0$ and $t_0$) are given, no information about $r_0$ is ascertained as long as $e_0$ and $t_0$ (or $e_1$ and $t_1$) are unknown. Consequently, zero-knowledge is ensured. Hereinafter, algorithms for a 3-pass scheme constructed on the basis of the above logic will be described. The algorithms for the 3-pass scheme described herein are made up of a key-generating algorithm Gen, a prover algorithm P, and a verifier algorithm V like the following.

(Key-Generating Algorithm Gen)

The key-generating algorithm Gen generates m multivariate polynomials $f_1(x_1, \ldots, x_n), \ldots, f_m(x_1, \ldots, x_n)$ defined on a ring K, and a vector $s=(s_1, \ldots, s_n)$ that is an element of the set $K^n$. Next, the key-generating algorithm Gen calculates $y=(y_1, \ldots, y_m) \leftarrow (f_1(s), \ldots, f_m(s))$. The key-generating algorithm Gen also sets $f_1(x_1, \ldots, x_n), \ldots, f_m(x_1, \ldots, x_n)$ as the public key, and set s as the secret key.

(Prover Algorithm P, Verifier Algorithm V)

Hereinafter, a process executed by the prover algorithm P and a process executed by the verifier algorithm V during the session protocol will be described with reference to FIG. 4. During the session protocol, the prover indicates to the verifier that "I know an s satisfying y=F(s)", without divulging information about the secret key s to the verifier. Meanwhile, the verifier verifies whether or not the prover knows an s satisfying y=F(s). Note that the public key pk is assumed to be made public to the verifier. Also, the secret key s is assumed to be kept a secret by the prover. Hereinafter, the description will proceed following the flowchart illustrated in FIG. 4.

Operation #1:

As illustrated in FIG. 4, the prover algorithm P first randomly generates the vector $r_0$, $t_0$ that is an element of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Additionally, the prover algorithm P calculates $t_1 \leftarrow r_0-t_0$. Subsequently, the prover algorithm P calculates $e_1 \leftarrow F(r_0)-e_0$.

Operation #1 (Continued):

Subsequently, the prover algorithm P calculates $c_0 \leftarrow H(r_1, G(t_0, r_1)+e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, c_1, c_2)$, the verifier algorithm V selects which verification pattern to use from among three verification patterns. For example, the verifier algorithm V may select a numerical value from among three numerical values $\{0, 1, 2\}$ representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$(r_0, t_1, e_1)$. In the case where Ch=1, the prover algorithm P generates a response Rsp=$(r_1, t_0, e_0)$. In the case where Ch=2, the prover algorithm P generates a response Rsp=$(r_1, t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1=H(r_0-t_1, F(r_0)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0=H(r_1, G(t_0, r_1)+e_0)$ holds. In addition, the verifier algorithm V verifies whether or not the equality of $c_1=H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0=H(r_1, y-F(r_1)-G(t_1, r_1)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

The foregoing thus describes an example of efficient algorithm structures related to a 3-pass scheme.

2-2. Example of Parallelized Algorithm Structures (FIG. 5)

Next, a method of parallelizing the algorithms of the 3-pass scheme illustrated in FIG. 4 will be described with reference to FIG. 5. However, further description of the structure of the key-generating algorithm Gen will be omitted.

Applying the above session protocol makes it possible to keep the probability of a successful forgery to 2/3 or less. Consequently, executing the session protocol twice makes it possible to keep the probability of a successful forgery to $(2/3)^2$ or less. Furthermore, if the session protocol is executed N times, the probability of a successful forgery becomes $(2/3)^N$, and if N is set to a sufficiently large number (N=140, for example), the probability of a successful forgery becomes negligibly small.

Conceivable methods of executing a session protocol multiple times include a serial method that sequentially repeats the exchange of message, challenge, and response multiple times, and a parallel method that exchanges multiple messages, challenges, and responses in a single exchange, for example. In addition, hybrid methods combining a serial method and a parallel method are also conceivable. Algorithms that execute the above session protocol related to a 3-pass scheme in parallel (hereinafter designated parallelized algorithms) will now be described with reference to FIG. 5.

Operation #1:

As illustrated in FIG. 5, the prover algorithm P first executes the following processes (1) to (6) for i=1 to N.

Process (1): The prover algorithm P randomly generates the vectors $r_{0i}$, $t_{0i}$ that are elements of the set $K^n$, and the vector $e_{0i}$ that is an element of the set $K^m$.

Process (2): The prover algorithm P calculates $r_{1i} \leftarrow s-r_{0i}$. This calculation is equivalent to masking the secret key s with the vector $r_{01}$. Additionally, the prover algorithm P calculates $t_{1i} \leftarrow r_{0i}+t_{0i}$.

Process (3): The prover algorithm P calculates $e_{1i} \leftarrow F(r_{0i})-e_{0i}$.

Process (4): The prover algorithm P calculates $c_{0i} \leftarrow H(r_{1i}, G(r_{1i}, t_{0i})+e_{0i})$.

Process (5): The prover algorithm P calculates $c_{1i} \leftarrow H(t_{0i}, e_{0i})$.

Process (6): The prover algorithm P calculates $c_{2i} \leftarrow H(t_{1i}, e_{1i})$.

Operation #1 (Continued):

After executing the above processes (1) to (6) for i=1 to N, the prover algorithm P calculates $Cmt \leftarrow H(c_{01}, c_{11}, c_{21}, \ldots, c_{0N}, c_{1N}, c_{2N})$. The hash value Cmt generated in operation #1 is sent to the verifier algorithm V. In this way, the message $(c_{01}, c_{11}, c_{21}, \ldots, c_{0N}, c_{1N}, c_{2N})$ is converted into a hash value before being sent to the verifier algorithm V, thus enabling a reduction in the communication volume. Note that the prover algorithm P may also send $(c_{01}, c_{11}, c_{21}, \ldots, c_{0N}, c_{1N}, c_{2N})$ to the verifier algorithm V.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values {0, 1, 2} representing verification patterns, and set the selected numerical value in a challenge $Ch_i$. The challenges $Ch_1, \ldots, Ch_N$ are sent to the prover algorithm P.

Operation #3:

Upon receiving the challenges $Ch_1, \ldots, Ch_N$, the prover algorithm P generates responses $Rsp_1, \ldots, Rsp_N$ to send to the verifier algorithm V in response to each of the received challenges $Ch_1, \ldots, Ch_N$. In the case where $Ch_i=0$, the prover algorithm P generates a response $Rsp_i=(r_{0i}, t_{1i}, e_{1i}, c_{0i})$. In the case where $Ch_i=1$, the prover algorithm P generates a response $Rsp_i=(r_{1i}, t_{0i}, e_{01}, c_{2i})$. In the case where $Ch_i=2$, the prover algorithm P generates a response $Rsp_i=(r_{1i}, t_{0i}, e_{1i}, c_{1i})$.

The responses $Rsp_1, \ldots, Rsp_N$ generated in operation #3 are sent to the verifier algorithm V.

Operation #4:

Upon receiving the responses $Rsp_1, \ldots, Rsp_N$, the verifier algorithm V executes the following processes (1) to (3) for i=1 to N, using the received responses $Rsp_1, \ldots, Rsp_N$. Herein, the verifier algorithm V executes the process (1) for the case where $Ch_i=0$, the process (2) in the case where $Ch_i=1$, and the process (3) in the case where $Ch_i=2$.

Process (1): In the case where $Ch_i=0$, the verifier algorithm V retrieves $(r_{0i}, t_{1i}, e_{1i}, c_{0i})$ from $Rsp_i$. Subsequently, the verifier algorithm V calculates $c_{1i}=H(r_{0i}-t_{1i}, F(r_{0i})-e_{1i})$. In addition, the verifier algorithm V calculates $c_{2i}=H(t_{1i}, e_{1i})$. The verifier algorithm V then stores $(c_{0i}, c_{1i}, c_{2i})$.

Process (2): In the case where $Ch_i=1$, the verifier algorithm V retrieves $(r_{1i}, t_{1i}, e_{0i}, c_{2i})$ from $Rsp_i$. Subsequently, the verifier algorithm V calculates $c_{0i}=H(r_{1i}, G(t_{0i}, r_{1i})+e_{0i})$. In addition, the verifier algorithm V calculates $c_{1i}=H(t_{0i}, e_{0i})$. The verifier algorithm V then stores $(c_{0i}, c_{1i}, c_{2i})$.

Process (3): In the case where $Ch_i=2$, the verifier algorithm V retrieves $(r_{1i}, t_{1i}, e_{1i}, c_{1i})$ from $Rsp_i$. Subsequently, the verifier algorithm V calculates $c_{0i}=H(r_{1i}, y-F(r_{1i})-G(t_{1i}, r_{1i})-e_{1i})$. In addition, the verifier algorithm V calculates $c_{2i}=H(t_{1i}, e_{1i})$. The verifier algorithm V then stores $(c_{0i}, c_{1i}, c_{2i})$.

After executing the above processes (1) to (3) for i=1 to N, the verifier algorithm V verifies whether or not the equality of $Cmt=H(c_{01}, c_{11}, c_{21}, \ldots, c_{0N}, c_{1N}, c_{2N})$ holds. The verifier algorithm V outputs the value 1 to indicate authentication success in the case where the verification succeeds, and outputs the value 0 to indicate authentication failure in the case where the verification fails.

The foregoing thus describes an example of efficient parallelized algorithm structures related to a 3-pass scheme.

3. Modification to Electronic Signature Scheme

Next a method of modifying the above public-key authentication scheme to an electronic signature scheme will be introduced.

Associating the prover in the model of the public-key authentication scheme with the signer in the electronic signature scheme easily demonstrates that the model of a public-key authentication scheme approximates the model of the electronic signature scheme in that only the prover is able to convince the verifier. On the basis of this thinking, a method of modifying the public-key authentication scheme discussed above to an electronic signature scheme will be described.

3-1. Modification from 3-Pass Public-Key Authentication Scheme to Electronic Signature Scheme (FIG. 6)

First, the modification from a 3-pass public-key authentication scheme to an electronic signature scheme will be described. As illustrated in FIG. 6, the algorithms modified from the 3-pass public-key authentication scheme to the electronic signature scheme are similar to parts of the parallelized versions of the algorithms from the 3-pass scheme described with FIG. 5. The algorithms for the public-key authentication scheme expressed by operation #1 to operation #4 in FIG. 5 are modified into a signature-generating algorithm Sig and a signature-verifying algorithm Ver as illustrated in FIG. 6.

Operation #1:

As illustrated in FIG. 6, operation #1 is similar to operation #1 in FIG. 5.

Operation #2:

In the next operation #2, $Cmt \leftarrow H(c_{01}, c_{11}, c_{21}, \ldots, c_{0N}, c_{1N}, c_{2N})$ which was sent to the verifier algorithm V in FIG. 5 is not sent to the signature-verifying algorithm Ver, and instead, the signature-generating algorithm Sig calculates the hash value $H(M, c_{01}, c_{11}, c_{21}, \ldots, c_{0N}, c_{1N}, c_{2N})$ of a message M with an attached Cmt and signature as $(Ch_1, \ldots, Ch_N)$. In other words, the signature-generating algorithm Sig calculates $(Ch_1, \ldots, Ch_N) \leftarrow H(M, c_{01}, c_{11}, c_{21}, \ldots, C_{0N}, C_{1N}, C_{2N})$ Operation #3:

As illustrated in FIG. 6, operation #3 is similar to operation #3 in FIG. 5. The signature-generating algorithm Sig generates a $q_i$ to send to the signature-verifying algorithm Ver in response to each of $Ch_1, \ldots, Ch_N$. In the case where $Ch_i=0$, the signature-generating algorithm Sig generates a response $q_i=(r_{0i}, t_{1i}, e_{1i}, c_{0i})$. In the case where $Ch_i=1$, the signature-generating algorithm Sig generates a response $q_i=(r_{1i}, t_{0i}, e_{01}, c_{2i})$. In the case where $Ch_i=2$, the signature-generating algorithm Sig generates a response $q_i=(r_{1i}, t_{1i}, e_{1i}, c_{1i})$.

$Ch_1, \ldots, Ch_N$ and $q_1, \ldots, q_N$ generated in operation #3 are sent to the signature-verifying algorithm Ver. At the same time, the message M with attached signature is also sent to the signature-verifying algorithm Ver.

Operation #4:

As illustrated in FIG. 6, operation #4 is basically similar to operation #4 in FIG. 5. Upon receiving the responses $q_1, \ldots, q_N$, the signature-verifying algorithm Ver executes the following processes (1) to (3) for i=1 to N, using the received responses $q_1, \ldots, q_N$. Herein, the signature-verifying algorithm Ver executes the process (1) for the case where $Ch_i=0$, the process (2) in the case where $Ch_i=1$, and the process (3) in the case where $Ch_i=2$.

Process (1): In the case where $Ch_i=0$, the signature-verifying algorithm Ver retrieves $(r_{0i}, t_{1i}, e_{1i}, c_{0i})$ from $q_i$. Subsequently, the signature-verifying algorithm Ver calculates $c_{1i}=H(r_{0i}-t_{1i}, F(r_{0i})-e_{1i})$. In addition, the signature-verifying algorithm Ver calculates $c_{2i}=H(t_{1i}, e_{1i})$. The signature-verifying algorithm Ver then stores $(c_{0i}, c_{1i}, c_{2i})$.

Process (2): In the case where $Ch_i=1$, the signature-verifying algorithm Ver retrieves $(r_{1i}, t_{0i}, e_{0i}, c_{2i})$ from $q_i$. Subsequently, the signature-verifying algorithm Ver calculates $c_{0i}=H(r_{1i}, G(t_{0i}, r_{1i})+e_{1i})$. In addition, the signature-verifying algorithm Ver calculates $c_{1i}=H(t_{0i}, e_{01})$. The signature-verifying algorithm Ver then stores $(c_{0i}, c_{1i}, c_{2i})$.

Process (3): In the case where $Ch_i=2$, the signature-verifying algorithm Ver retrieves $(r_{1i}, t_{1i}, e_{1i}, c_{1i})$ from $q_i$. Subsequently, the signature-verifying algorithm Ver calculates $c_{0i}=H(r_{1i}, y-F(r_{1i})-G(t_{1i}, r_{1i})-e_{1i})$. In addition, the signature-verifying algorithm Ver calculates $c_{2i}=H(t_{1i}, e_{1i})$. The signature-verifying algorithm Ver then stores $(c_{0i}, c_{1i}, c_{2i})$.

After executing the above processes (1) to (3) for i=1 to N, the signature-verifying algorithm Ver verifies whether or not the equality of $(Ch_1, \ldots, Ch_N)=H(M, c_{01}, c_{11}, c_{21}, \ldots, c_{0N}, c_{1N}, c_{2N})$ holds. The signature-verifying algorithm Ver outputs the value 1 to indicate authentication success in the case where the verification succeeds, and outputs the value 0 to indicate authentication failure in the case where the verification fails.

As described above, associating the prover in the model of a public-key authentication scheme with the signer in an electronic signature scheme enables the modification of the algorithms for the public-key authentication scheme into algorithms for the electronic signature scheme.

4. First Embodiment 4-1. Conclusion of System According to First Embodiment

FIG. 7 is a schematic diagram summarizing a system according to the first embodiment. First, a system according to the first embodiment will be summarized with reference to FIG. 7. As illustrated in FIG. 7, a system according to the first embodiment includes a first information processing apparatus 100 and a second information processing apparatus 200. The first information processing apparatus 100 is an apparatus possessed by the user who uses the system, for example. Meanwhile, the second information processing apparatus 200 is an external apparatus not possessed by the user, for example.

In order to authenticate according to the electronic signature scheme discussed above, in the first embodiment, an IC card 300 is equipped with electronic signature-generating functionality. By carrying such an IC card 300, the user becomes able to safely generate an electronic signature, even in the case of using the external second information processing apparatus 200. The exchange of information between the IC card 300 and the first information processing apparatus 100 or the second information processing apparatus 200 uses an interface such as a FeliCa port or NFC device.

With the configuration illustrated in FIG. 7, the user is able to carry the IC card 300 with signature-generating functionality outside and generate a signature in conjunction with the second information processing apparatus 200, an external terminal. At this point, the majority of calculation is performed in advance on the user's own first information processing apparatus 100, and given information is saved onto the IC card 300. Computation which does not depend on the message and which poses no security risk is performed on the first information processing apparatus 100. By making the processing related to the IC card 300 involve only reading data from the IC card 300, the computations performed on the IC card 300 can be minimized. Consequently, the processing load on the IC card 300 can be reduced to achieve faster processing.

4-2. Process by System According to First Embodiment

In the first embodiment, the first information processing apparatus 100 conducts the part of the algorithms illustrated in FIG. 6 which does not depend on the message (Msg) (the message-independent part). When the process conducted by the first information processing apparatus 100 is described on the basis of FIG. 7, the first information processing apparatus 100 first generates a secret key x that is an element of the set $K^n$, which is saved in internal memory in the first information processing apparatus 100. Next, information used to generate an electronic signature is generated. At this point, $r_{1,i}, r_{0,i}, t_{1,i}, e_{1,i}, e_{0,i}, c_{0,i}, c_{1,i}$, (where i=1, ..., N) described with FIG. 6 are generated. The generated information $r_{1,i}, r_{0,i}, t_{1,i}, t_{0,i}, e_{1,i}, e_{0,i}, c_{0,i}, c_{1,i}$, and $c_{2,i}$ and $c_{24}$ (where i=1, ..., N) is transferred from the first information processing apparatus 100 to the IC card 300 by conducting near field communication between the first information processing apparatus 100 and the IC card 300 using an interface such as a FeliCa port or NFC device. Note that the information $r_{1,i}, r_{0,i}, t_{1,i}, t_{0,i}, e_{1,i}, e_{0,i}, c_{0,i}, c_{1,i}$, and $c_{2,i}$ (where i=1, ..., N) is updated every time an electronic signature is generated.

In this way, by calculating the message-independent part (the random number generation, MQ function calculation, and hash value calculation of the message-independent part) in advance on the first information processing apparatus 100, the IC card 300 becomes able to skip these calculations. Consequently, it becomes possible to reduce the manufacturing costs of the IC card 300 and not increase the processing capability of the IC card 300, even in the case of using the IC card 300 to generate an electronic signature. Moreover, since the overall processing time for electronic signature generation is almost entirely occupied by generating the message-independent part, having the first information processing apparatus 100 perform such computation in advance enables a significant speedup in the overall time taken to generate a signature.

Next, the second information processing apparatus 200 and the IC card 300 communicate, thereby generating information for the part illustrated in FIG. 6 that depends on the message M (the message-dependent part). FIG. 8 is a sequence diagram illustrating a process that generates information for a message-dependent part. According to this sequence, an electronic signature is ultimately generated at the second information processing apparatus 200.

First, in step S10, a message M is generated on the second information processing apparatus 200. Next, in step S12, a start command for generating a signature for the message M is transmitted from the second information processing apparatus 200 to the IC card 300. In the next step S14, information $c_{0,i}, c_{1,i}$, and $c_{2,i}$ (where i=1, ..., N) used in signature generation is transferred from the IC card 300 to the second information processing apparatus 200.

In the next step S16, the second information processing apparatus 200 generates information $Ch_1, \ldots, Ch_N$ for signature generation. The information $Ch_1, \ldots, Ch_N$ is generated as a hash value $H(M, c_{0,1}, c_{1,1}, c_{2,1}, \ldots, c_{0,N}, c_{1,N},$ $c_{2,N}$). In the next step S18, the second information processing apparatus 200 transfers the information $Ch_1, \ldots, Ch_N$ for signature generation to the IC card 300.

In the next step S20, the IC card 300 retrieves the values $q_i$ inside the IC card 300 on the basis of the transmitted information $Ch_1, \ldots, Ch_N$. In the next step S22, the IC card 300 transfers the information $q_i$ retrieved in step S20 to the second information processing apparatus 200. In the next step S24, the second information processing apparatus 200 acquires the electronic signatures $q_i, \ldots, q_N$. In steps S20 and S22, the IC card 300 selects, for $i=1, \ldots, N$, any of $q_i <- (r_{0,i}, t_{1,i}, e_{1,i}, c_{0,i})$, $q_i <- (r_{1,i}, t_{1,i}, e_{1,i}, c_{1,i})$, and $q <- (r_{1,i}, t_{0,i}, e_{0,i}, c_{2,i})$ according to the value of $Ch_i$. Having acquired the electronic signatures, the second information processing apparatus 200 sends the message M together with the electronic signatures $q_1, \ldots, q_N$ and $Ch_1, \ldots, Ch_N$ to the verifier's terminal, thus making it possible to receive verification as illustrated in FIG. 6.

Note that a card usage limit may be determined as a countermeasure against loss of the IC card 300, in which information equivalent to a single electronic signature generation is deleted from memory inside the IC card 300 with every use. Alternatively, an electronic signature generation count may be stored, and the information inside the IC card 300 may be deleted when a given count is reached.

According to the above process, the IC card 300 is able to generate a signature in conjunction with an external terminal (the second information processing apparatus 200), and thus the calculation load on the IC card 300 can be reduced. The IC card 300 basically only conducts a data retrieval process, with an external terminal (the first information processing apparatus 100) conducting the hash value calculation by proxy. Consequently, the processing load on the IC card 300 can be minimized.

4-3. Exemplary Configuration of System According to First Embodiment

FIG. 9 is a function block diagram illustrating a configuration of the first embodiment. As illustrated in FIG. 9, the second information processing apparatus 200 includes a message generator 202, a hash value generator 204, an information storage unit 206, a transceiver 208, and an electronic signature generator 210. Meanwhile, the IC card 300 includes an information storage unit (information retention unit) 302 and a transceiver 304. Note that the configuration illustrated in FIG. 9 may be realized by circuits (hardware), or by a program (software) causing a processor such as a CPU to function as such a configuration. This applies similarly to FIGS. 12 and 14.

The message generator 202 generates a message M in step S10 of FIG. 8. The hash value generator 204 generates a hash value for signature generation in step S16 of FIG. 8. The information storage unit 206 is an information recording unit that stores information such as the message M, the information $c_{0,i}, c_{1,i}$, and $c_{2,i}$ (where $i=1, \ldots, N$) used for signature generation, and the electronic signatures $q_1, \ldots, q_N$. The transceiver 208 transmits a signature generation command to the IC card 300 in step S12 of FIG. 8. The transceiver 208 also receives the information $c_{0,i}, c_{1,i}$, and $c_{2,i}$ (where $i=1, \ldots, N$) used for signature generation in step S14. The transceiver 208 also transmits the hash values $Ch_1, \ldots, Ch_N$ to the IC card 300 in step S18. The transceiver 208 also receives the electronic signatures $q_1, \ldots, q_N$ from the IC card 300 in step S22.

The information storage unit 302 in the IC card 300 stores (retains) information for the message-independent part generated by the first information processing apparatus 100. The transceiver 304 transmits the information $c_{0,i}, c_{1,i}$, and $c_{2,i}$ (where $i=1, \ldots, N$) used for signature generation from among the information stored in the information storage unit 302 to the second information processing apparatus 200 in step S14 of FIG. 8. The transceiver 304 also transmits the information which is retrieved from the information storage unit 302 on the basis of information transmitted from the second information processing apparatus 200, to the second information processing apparatus 200 in step S20.

4-4. Modification of First Embodiment

In step S22 of the example illustrated in FIG. 8, $c_{j,i}$ is transmitted to the second information processing apparatus 200 as part of $q_i$. In other words, in step S20, the following values are retrieved as $q_i$.

For $i=1, \ldots, N$
If $Ch_i=0$ then $q_i ->(r_{0,i}, t_{1,i}, e_{1,i}, c_{0,i})$
If $Ch_i=1$ then $q_i ->(r_{1,i}, t_{1,i}, c_{1,i})$
If $Ch_i=2$ then $q_i ->(r_{1,i}, t_{0,i}, e_{0,i}, c_{2,i})$ At this point, since $c_{j,i}$ was already sent to the second information processing apparatus 200 in step S 14, the transmission of in step S22 may also be omitted.

For this reason, in FIG. 13, a step S26 is provided instead of step S22 in FIG. 8. In step S26, $q_i'=q_1', \ldots, q_N'$, in which $c_{j,i}$ is removed from is transmitted from the IC card 300 to the second information processing apparatus 200. In other words, the following values are retrieved in step S20.

For $i=1, \ldots, N$
If $Ch_i=0$ then $q_i ->(r_{0,i}, t_{1,i}, e_{1,i})$
If $Ch_i=1$ then $q_i ->(r_{1,i}, t_{1,i}, e_{1,i})$
If $Ch_i=2$ then $q_i ->(r_{1,i}, t_{0,i}, e_{0,i})$ Thus, in step S26, the communication volume can be further reduced than step S22 of FIG. 8, which transmits $q_i=q_1 \ldots, q_N$.

Having received $q_i'=q_1', \ldots, q_N'$ by the processing in step S26, the second information processing apparatus 200 adds $c_{j,i}$ to each of $q_1', \ldots, q_N'$ to generate $q_1, \ldots, q_N$ in step S28. The terms $c_{j,i}$ are stored in the hash value generator 204 in step S15 after being received from the IC card 300 in step S14. Thus, the second information processing apparatus 200 is able to generate the electronic signatures $q_1, \ldots, q_N$ in step S28. The electronic signature generator 210 illustrated in FIG. 9 generates the electronic signatures $q_1, \ldots, q_N$.

According to the first embodiment as described above, a message-independent part is generated by the user's own terminal (the first information processing apparatus 100) and transferred to the IC card 300, thereby enabling the generation of an electronic signature using an external terminal (the second information processing apparatus 200).

5. Second Embodiment 5-1. Conclusion of System According to Second Embodiment

Next, the second embodiment of the present disclosure will be described. In the first embodiment, the second information processing apparatus 200 generates the hash values $Ch_1, \ldots, Ch_N$ (step S16 in FIG. 8, the hash value generator 204 in FIG. 9). In the second embodiment, hash values are generated by substitute calculation on another device equipped with hash-generating functionality in the case where the second information processing apparatus 200 is not equipped with hash-generating functionality.

FIG. 10 is a schematic diagram summarizing a system according to the second embodiment. First, a system according to the second embodiment will be summarized with reference to FIG. 10. As illustrated in FIG. 10, a system according to the second embodiment includes a server 400 in addition to the first information processing apparatus 100 and the second information processing apparatus 200. The basic configuration of the first information processing apparatus 100 and the second information processing apparatus 200 is similar to the first embodiment, but assume that the second information processing apparatus 200 lacks hash-generating functionality.

Similarly to the first embodiment, in the second embodiment the first information processing apparatus 100 likewise conducts the part of the algorithms illustrated in FIG. 6 which does not depend on the message (Msg) (the message-independent part). The first information processing apparatus 100 generates a secret key x that is an element of the set $K^n$, which is saved in internal memory in the first information processing apparatus 100. Next, information used to generate an electronic signature is generated. The generated information $r_{1,i}$, $r_{0,i}$, $t_{1,i}$, $t_{0,i}$, $e_{1,i}$, $e_{0,i}$, $c_{0,i}$, $c_{1,i}$, and $c_{2,i}$ (where i=1, . . . , N) is transferred from the first information processing apparatus 100 to the IC card 300 by conducting near field communication between the first information processing apparatus 100 and the IC card 300.

In addition, the first information processing apparatus 100 transmits information for calculating hash values to the server 400. Specifically, the first information processing apparatus 100 transmits an ID number and $c_{0,i}$, $c_{1,i}$, and $c_{2,i}$ (where i=1, . . . , N) to the server 400 as the information for calculating hash values. The ID number and $c_{0,i}$, $c_{1,i}$, and $c_{2,i}$ (where i=1, . . . , N) are saved in the server 400. The ID number herein is a value corresponding to $c_{0,i}$, $c_{1,i}$, and $c_{2,i}$ (where i=1, . . . , N), and the server 400 is able to extract the corresponding $c_{0,i}$, $c_{1,i}$, and $c_{2,i}$ (where i=1, . . . , N) on the basis of the ID number.

The second information processing apparatus 200 cooperates with the server 400 to create a message-dependent part. At this point, the second information processing apparatus 200 works in conjunction with the server 400 to create, on the basis of information saved in the IC card 300, a signature for the document, data, or other information (the message M) created by the second information processing apparatus 200. Details are described below.

5-2. Process by System According to Second Embodiment

A process of the second embodiment will be described on the basis of FIG. 11. FIG. 11 is a sequence diagram illustrating a process of the second embodiment, and illustrates a process that generates information for a message-dependent part. First, in step S30, a message M is generated on the second information processing apparatus 200. Next, in step S32, a start command for generating a signature for the message M is transmitted from the second information processing apparatus 200 to the IC card 300.

In the next step S34, a signature generation ID number for generating a signature is sent from the IC card 300 to the second information processing apparatus 200. The signature generation ID number is sent in order to identify $c_{0,1}$, . . . , $c_{2,n}$. In the next step S36, the ID number is transmitted from the second information processing apparatus 200 to the server 400.

As discussed earlier, the server 400 is already storing an ID number and information $c_{0,1}$, $c_{1,i}$, and $c_{2,i}$ (where i=1, . . . , N) transmitted from the first information processing apparatus 100.

In the next step S38, the server 400 checks the ID number received from the second information processing apparatus 200. In the next step S40, a message send command is transmitted from the server 400 to the second information processing apparatus 200. In the next step S42, the message M is transmitted from the second information processing apparatus 200 to the server 400.

In the next step S44, the server 400 generates information for signature generation (the hash values $Ch_1$, . . . , $Ch_N$). At this point, the server 400 extracts from memory the $c_{0,i}$, $c_{1,i}$, and $c_{2,i}$ (where i=1, . . . , N) corresponding to the ID number checked in step S38, and computes the hash values H(M, $c_{0,1}$, $c_{1,1}$, $c_{2,1}$, . . . , $c_{0,N}$, $c_{1,N}$, $c_{2,N}$) as $Ch_1$, . . . , $Ch_N$. In the next step S46, the server 400 transmits the information $Ch_1$, . . . , $Ch_N$ for signature generation to the second information processing apparatus 200. In the next step S48, the second information processing apparatus 200 transfers the information $Ch_1$, . . . , $Ch_N$ for signature generation to the IC card 300.

In the next step S50, the IC card 300 retrieves internally recorded values on the basis of the transmitted information $Ch_1$, . . . , $Ch_N$. In the next step S52, the IC card 300 transfers the retrieved information (the electronic signatures $q_i$, . . . , $q_N$) to the second information processing apparatus 200. In steps S50 and S52, the IC card 300 selects, for i=1, . . . , N, any of $q_i\leftarrow(r_{0,i}, t_{1,i}, e_{1,i}, c_{0,i})$, $q_i\leftarrow(r_{1,i}, t_{1,i}, e_{1,i}, c_{1,i})$, and $q_i\leftarrow(r_{1,i}, t_{0,i}, e_{0,i}, c_{2,i})$ according to the value of $Ch_i$. In the next step S54, the second information processing apparatus 200 acquires the electronic signatures $q_1$, . . . , $q_N$. Having acquired the electronic signatures, the second information processing apparatus 200 sends the message M together with the electronic signatures $q_1$, . . . , $q_N$ and $Ch_1$, . . . , $Ch_N$ to the verifier's terminal, thus making it possible to receive verification.

5-3. Exemplary Configuration of System According to Second Embodiment

FIG. 12 is a function block diagram illustrating a configuration of the second embodiment. As illustrated in FIG. 12, the second information processing apparatus 200 includes a message generator 202, an information storage unit 206, and a transceiver 208. Meanwhile, the IC card 300 includes an information storage unit 302 and a transceiver 304. The server 400 includes an ID number checker 402, a hash value generator 404, an information storage unit 406, and a transceiver 408.

The message generator 202 in FIG. 12 generates a message M in step S30 of FIG. 11. The information storage unit 206 stores information such as the message M, the information $Ch_1$, . . . , $Ch_N$ used for signature generation, and the electronic signatures $q_1$, . . . , $q_N$. The transceiver 208 transmits a signature generation command to the IC card 300 in step S32 of FIG. 11. The transceiver 208 also receives an ID number in step S34, and transmits the ID number in step S36. The transceiver 208 also receives a message send command in step S40, and transmits the message M in step S42. The transceiver 208 also receives the information $Ch_1$, . . . , $Ch_N$ used for signature generation in step S46, and transmits the information $Ch_1$, . . . , $Ch_N$ used for signature generation to the IC card 300 in step S48. The transceiver 208 also receives the electronic signatures $q_1$, . . . , $q_N$ in step S52.

According to the second embodiment as described above, hash values may be generated at the server 400 in the case where the second information processing apparatus 200 is not equipped with hash-generating functionality. Consequently, it becomes possible to acquire electronic signatures even in cases where the second information processing apparatus 200 (that is, the external terminal) lacks special functionality.

6. Third Embodiment 6-1. Conclusion of System According to Third Embodiment

Next, the third embodiment of the present disclosure will be described. The basic system configuration of the third embodiment is similar to the first embodiment illustrated in FIG. 7. In the third embodiment, not all of the information that the first information processing apparatus 100 of the first embodiment saves to the IC card 300 is saved to a secure area, and only information regarding the secret key is saved and protected in a secure area. Thus, it is possible to limit the size of the secure memory area, and reduce the manufacturing costs of the IC card 300.

In the third embodiment, the first information processing apparatus 100 likewise conducts the part of the algorithms illustrated in FIG. 6 which does not depend on the message (Msg) (the message-independent part). The generated information $r_{1,i}$, $r_{0,i}$, $t_{1,i}$, $t_{0,i}$, $e_{1,i}$, $e_{0,i}$, $c_{0,i}$, $c_{1,i}$, and $c_{2,i}$ (where i=1, . . . , N) is transferred from the first information processing apparatus 100 to the IC card 300 by conducting near field communication between the first information processing apparatus 100 and the IC card 300.

In the first embodiment, the information $r_{1,i}$, $r_{0,i}$, $t_{1,i}$, $e_{0,i}$, $c_{0,i}$, $c_{1,i}$, and $c_{2,i}$ (where i=1, . . . , N) is entirely stored in a secure area of the information storage unit 302. In contrast, in the third embodiment, only the information $r_{1,i}$, $r_{0,i}$, $t_{1,i}$, and $t_{0,i}$ (where i=1, . . . , N) related to the secret key is stored in a secure area from among the information $r_{1,i}$, $r^{0,i}$, $t_{1,i}$, $t_{0,i}$, $e_{1,i}$, $e_{0,i}$, $c_{0,i}$, $c_{1,i}$, and $c_{2,i}$ (where i=1, . . . , N).

6-2. Exemplary Configuration of System According to Third Embodiment

FIG. 14 is a function block diagram illustrating a configuration of the third embodiment. Compared to the configuration in FIG. 9, the information storage unit 302 of the IC card 300 is divided in two, and the IC card 300 is equipped with an information storage unit (secure area) 302a and an information storage unit (non-secure area) 302b. Whereas the non-secure area 302b is an ordinary memory area, the secure area 302a is an area protected from factors such as external attack or intrusion, eavesdropping, and tampering. Only the information $r_{1,i}$, $r_{0,i}$, $t_{1,i}$, and $t_{0,i}$ (where i=1, . . . , N) related to the secret key is stored in the information storage unit (secure area) 302a from among the information $r_{1,i}$, $r_{0,i}$, $t_{1,i}$, $t_{0,i}$, $e_{1,i}$, $e_{0,i}$, $c_{0,i}$, $c_{1,i}$, and $c_{2,i}$ (where i=1, . . . , N). Other information is stored in the information storage unit (non-secure area) 302b. Thus, it is possible to reliably deter divulgence of the secret key, while also keeping the size of the secure memory area to a minimum.

According to the third embodiment as described above, it is possible to keep the secure area to a minimum from among the memory areas provided in the IC card 300. Consequently, it becomes possible to reduce the manufacturing costs of the IC card 300.

7. Fourth Embodiment 7-1. Conclusion of System According to Fourth Embodiment

Next, the fourth embodiment of the present disclosure will be described. In the first embodiment, $c_{i,j}=c_{0,1}$, $c_{1,i}$, $c_{2,i}$ (where i=1, . . . , N)=$c_{0,1}$, $c_{1,1}$, $c_{2,1}$, . . . , $c_{0,N}$, $c_{1,N}$, $c_{2,N}$ is transmitted from the IC card 300 to the second information processing apparatus 200 in step S14 of FIG. 8. The second information processing apparatus 200 then calculates hash values on the basis of in step S16. The fourth embodiment reduces the communication volume in step S14 as well as the computational complexity in step S16 by sending information compressing $c_{i,j}$ in advance by utilizing the features of MD hash functions.

FIG. 15 is a schematic diagram illustrating an MD hash function (Merkle-Damgard construction). The hash function illustrated in FIG. 15 is equivalent to SHA-1/224/256/384/512 according to Federal Information Processing Standard (FIPS) Publication 180-3, for example. A hash function of this type has the feature of sequentially compressing an input message (data m of arbitrary length) from the beginning. When modified, the hash values computed in step S16 in FIG. 8 may be expressed as follows. $H(c_{0,1}, c_{1,1}, c_{2,2}, \ldots, c_{0,N}, c_{1,N}, c_{2,N}, M) = g(k(c_{0,1}, c_{1,1}, c_{2,1}, \ldots, c_{0,N}, c_{1,N}, c_{2,N}), M)$ On the right side of the above equation, $k(c_{0,1}, c_{1,1}, c_{2,1}, \ldots, c_{0,N}, c_{1,N}, c_{2,N})$ are hash values related to $c_{i,j}=c_{0,i}$, $c_{1,i}$, $c_{2,i}$ (where i=1, . . . , N), and can be calculated in advance without acquiring the message M first. For this reason, in the fourth embodiment, the information $k(c_{0,1}, c_{1,1}, c_{2,1}, \ldots, c_{0,N}, c_{1,N}, c_{2,N})$ related to $c_{i,j}$ is pre-calculated in compressed form by the first information processing apparatus 100. The second information processing apparatus 200 then calculates the final hash values $g(k(c_{0,1}, c_{1,1}, c_{2,1}, \ldots, c_{0,N}, c_{1,N}, c_{2,N}), M)$ in accordance with the message M. Thus, it is possible to greatly reduce the computational complexity in step S16.

The general features of the system in the fourth embodiment are similar to those of the first embodiment illustrated in FIG. 7. In the fourth embodiment, the first information processing apparatus 100 conducts the part of the algorithms illustrated in FIG. 6 which does not depend on the message M (the message-independent part), and generates the information $r_{1,i}$, $r_{0,i}$, $t_{1,i}$, $e_{1,i}$, $e_{0,i}$, $c_{0,1}$, and $c_{2,i}$ (where i=1, . . . , N) similarly to the first embodiment.

In the first embodiment, the generated information $r_{1,i}$, $r_{0,i}$, $t_{1,i}$, $t_{0,i}$, $e_{1,i}$, $e_{0,i}$, $c_{0,i}$, $c_{1,i}$, and $c_{2,i}$ (where i=1, . . . , N) is transferred to the IC card 300. In contrast, in the fourth embodiment, the first information processing apparatus 100 generates the information $k(c_{0,1}, \ldots, c_{2,N})$ on the basis of $c_{0,i}$, $c_{1,i}$, and $c_{2,i}$ (where i=1, . . . , N). The information $r_{1,i}$, $r_{0,i}$, $t_{1,i}$, $t_{0,i}$, $e_{1,i}$, $e_{0,i}$, $c_{0,i}$, $c_{1,i}$, and $c_{2,i}$ (where i=1, . . . , N) and $k(c_{0,1}, \ldots, c_{2,N})$ generated by the first information processing apparatus 100 is then transferred from the first information processing apparatus 100 to the IC card 300 by conducting near field communication between the first information processing apparatus 100 and the IC card 300.

FIG. 16 is a sequence diagram illustrating a process of the fourth embodiment, and illustrates a process that generates information for a message-dependent part. Compared to FIG. 8 of the first embodiment, the information $k(c_{0,1}, \ldots, c_{2,N})$ is saved in the IC card 300 in advance, in addition to the information $r_{1,i}$, $r_{0,i}$, $t_{1,i}$, $t_{0,i}$, $e_{1,i}$, $e_{0,i}$, $c_{0,i}$, $c_{1,i}$, and $c_{2,i}$ (where i=1, . . . , N).

Additionally, in FIG. 16, the processing in step S15 is conducted instead of step S14 in FIG. 8. In step S15, the information $k(c_{0,1}, \ldots, c_{2,N})$ is transmitted from the IC card 300 to the second information processing apparatus 200 as information used in signature generation. Thus, it is possible to greatly reduce the communication volume compared to step 14 in FIG. 8, which transmits $c_{0,1}, \ldots, c_{2,N}$.

Also, in FIG. 16, a step S17 is provided instead of step S16 in FIG. 8. In step S17, the hash values $H(c_{0,i}, c_{1,1}, c_{2,2}, \ldots, c_{0,N}, c_{1,N}, c_{2,N}, M)$ are computed by calculating $g(k(c_{0,1}, c_{1,1}, c_{2,1}, \ldots, c_{0,N}, c_{1,N}, c_{2,N}), M)$. Thus, since $k(c_{0,1}, c_{1,1}, c_{2,1}, \ldots, c_{0,N}, c_{1,N}, c_{2,N})$ is transferred from the IC card 300 to the second information processing apparatus 200 in step S15, it is possible to reduce the computational complexity in step S17 when computing the hash values $H(c_{0,1}, c_{1,1}, c_{2,2}, \ldots, c_{0,N}, c_{1,N}, c_{2,N}, M)$ to less than the computational complexity in step S16 of FIG. 8.

According to the fourth embodiment as described above, the first information processing apparatus 100 partially computes the hash values H related to and saves the result in the IC card 300 as $k(c_{0,1}, c_{1,1}, c_{2,1}, \ldots, c_{0,N}, c_{1,N}, c_{2,N})$. Thus, it becomes possible to reduce the communication volume when sending information relevant to signature generation from the IC card 300 to the second information processing apparatus 200, and also reduce the computational complexity at the second information processing apparatus 200.

8. Authentication Protocol

In the foregoing description of the embodiments, a public-key authentication scheme that bases its safety on the difficulty of solving high-order, multivariate systems of equations is given as an example of the user authentication scheme. However, the user authentication protocol is not limited thereto, and other protocols are widely usable insofar as the authentication protocol is separable into a part that does not depend on the message M, and a part that does depend on the message, as illustrated by way of example in FIG. 6. Note that, as discussed earlier, an authentication protocol refers to cryptographic technology used to prove that an entity possesses a secret key s corresponding to a public key v, without revealing the secret key s. Consequently, by registering the public key v in the second information processing apparatus 200 in advance, it is possible to use the second information processing apparatus 200 to authenticate a user.

Other authentication protocols such as ECDSA may be used, for example. Another authentication protocol such as an authentication protocol based on the syndrome decoding problem may also be used (see "A new paradigm for public key identification", CRYTPO 1993, IEEE Trans. on IT 1996). Since such authentication protocols are separable into a part that does not depend on the message M and a part that does depend on the message, it is still possible to generate an electronic signature similarly to the above.

9. Exemplary Hardware Configuration (FIG. 17)

It is possible to execute the respective algorithms above by using the hardware configuration of an information processing apparatus illustrated in FIG. 17, for example. In other words, the processing by each algorithm is realized by using a computer program to control the hardware illustrated in FIG. 17. Note that the format of this hardware is arbitrary, and encompasses personal computers, mobile phones, portable information terminals such as PHS devices and PDAs, game consoles, contact or contactless IC chips, contact or contactless IC cards, and various information appliances, for example. Note that PHS above is an abbreviation of Personal Handy-phone System, while PDA above is an abbreviation of personal digital assistant.

As illustrated in FIG. 17, the hardware primarily includes a CPU 902, ROM 904, RAM 906, a host bus 908, and a bridge 910. The hardware additionally includes an external bus 912, an interface 914, an input unit 916, an output unit 918, a storage unit 920, a drive 922, a connection port 924, and a communication unit 926. Note that CPU above is an abbreviation of central processing unit, while ROM above is an abbreviation of read-only memory, and RAM above is an abbreviation of random access memory.

The CPU 902 functions as a computational processing device or control device, for example, and controls all or part of the operation of each structural element on the basis of various programs recorded in the ROM 904, the RAM 906, the storage unit 920, or a removable recording medium 928. The ROM 904 is a means of storing information such as programs loaded by the CPU 902 and data used in computations. The RAM 906 transiently or persistently stores information such as programs loaded by the CPU 902, and various parameters that change as appropriate when executing such programs, for example.

These structural elements are interconnected via a host bus 908 capable of high-speed data transmission, for example. Meanwhile, the host bus 908 is connected via the bridge 910 to an external bus 912 having comparatively low-speed data transmission, for example. Devices such as a mouse, keyboard, touch panel, buttons, switches, and levers may be used as the input unit 916, for example. Additionally, a remote control (hereinafter, remote) capable of using infrared or other electromagnetic waves to transmit control signals may be used as the input unit 916 in some cases.

The output unit 918 includes a device capable of visually or aurally reporting acquired information to a user, and may be a display device such as a CRT, LCD, PDP, or ELD, an audio output device such as one or more speakers or headphones, a printer, a mobile phone, or a fax machine, for example. Note that CRT above is an abbreviation of cathode ray tube, while LCD above is an abbreviation of liquid crystal display, PDP above is an abbreviation of plasma display panel, and ELD above is an abbreviation of electroluminescent display.

The storage unit 920 is a device that stores various data. Devices such as a hard disk drive or other magnetic storage device, a semiconductor storage device, an optical storage device, or a magneto-optical storage device may be used as the storage unit 920, for example. Note that HDD above is an abbreviation of hard disk drive.

The drive 922 is a device that reads out information recorded onto a removable recording medium 928 such as a magnetic disk, an optical disc, a magneto-optical disc, or semiconductor memory, for example, and may also write information to the removable recording medium 928. The removable recording medium 928 is an instance of DVD media, Blu-ray media, HD DVD media, or various semiconductor storage media, for example. Obviously, the removable recording medium 928 may also be an IC card mounted with a contactless IC chip, or other electronic device, for example. Note that IC above is an abbreviation of integrated circuit.

The connection port 924 is a port that connects to an externally-connected device 930, such as a USB port, an IEEE 1394 port, a SCSI port, an RS-232C port, or an optical audio terminal, for example. The externally-connected device 930 may be a printer, a portable music player, a digital camera, a digital video camera, or an IC recorder, for example. Note that USB above is an abbreviation of Universal Serial Bus, while SCSI above is an abbreviation of Small Computer System Interface.

The communication unit 926 is a communication device that connects to a network 932, and may be a communication card for wired or wireless LAN, Bluetooth (registered trademark), or WUSB, an optical communication router, an ADSL router, or a device for contact or contactless communication, for example. Also, the network 932 connected to the communication unit 926 is a network connected in a wired or wireless manner, and may be the Internet, a home LAN, infrared communication, visible light communication, broadcasting, or satellite communication, for example. Note that LAN above is an abbreviation of local area network, while WUSB above is an abbreviation of Wireless USB, and ADSL above is an abbreviation of asymmetric digital subscriber line.

The technical matter discussed in the foregoing may be applied to various information processing apparatus, such as PCs, mobile phones, game consoles, information terminals, information appliances, and car navigation systems, for example. Note that the functions of the information processing apparatus discussed below are realizable using a single information processing apparatus, and also realizable using multiple information processing apparatus. Also, the data storing means and computing means used when the information processing apparatus discussed below executes a process may be provided in that information processing apparatus, and may also be provided in equipment connected via a network.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-190446 filed in the Japan Patent Office on Aug. 30, 2012, the entire content of which is hereby incorporated by reference. However, it should be noted that the Greek letters lambda and sigma used in JP2012-190446 are replaced with "p" and "q" in the present specification and the present drawings, respectively.

Additionally, the present technology may also be configured as below.

(1) An information processing system comprising:
interface circuitry configured to
receive message-independent information, the message-independent information having been generated by another apparatus and transferred to the interface in advance of a digital signature being generated,
send message-dependent information to an external device, and
receive a digital signature from the external device; and
processing circuitry configured to
generate the message-dependent information from a message and at least a part of the message-independent information, and
associate the digital signature with the message.

(2) The information processing system of (1), wherein:
the interface circuitry is configured to receive the message-independent information in at least one near field communication message.

(3) The information processing system of (1), further comprising:
the external device,
wherein the external device is configured to delete information used to generate digital signatures after a predetermined number of uses.

(4) The information processing system of (3), wherein:
the external device is configured to count a number of digital signature generation events and delete the information after the count reaches a predetermined threshold.

(5) The information processing system of (1), wherein:
the interface circuitry receives from the external device information used in the generation of the digital signature.

(6) The information processing system of (1), wherein:
the interface circuitry receives from the external device information extracted from the message-independent information and corresponds to the message-dependent information sent to the external device.

(7) The information processing system of (1), further comprising:
another external device that generates a hash value used for digital signature generation and sends the hash value to at least one of the interface circuitry and the external device.

(8) The information processing system of (1), further comprising:
the external device;
wherein the external device includes a secure area that only holds information regarding a secret key.

(9) The information processing system of (1), wherein:
the interface circuitry receives from the external device a hash value relevant to signature generation so as to reduce communication volume between the external device and the interface circuitry.

(10) The information processing system of (1), wherein:
the digital signature is compliant with an MQ protocol.

(11) The information processing system of (1), wherein the message-independent information is updated each time a different digital signature is generated.

(12) The information processing system of (7), wherein the another external device generates the hash value based on an ID number that is stored or transmitted to the another external device.

(13) The information processing apparatus of (1), wherein:
the processing circuitry sends the message with the digital signature to a Verifier.

(14) The information processing system of (1), wherein, the external device being one of an IC card, a mobile phone, or a PDA.

(15) An information processing method comprising:
receiving message-independent information, the message-independent information having been generated by another apparatus and transferred to the interface in advance of a digital signature being generated,
generating with processing circuitry message-dependent information from a message and at least a part of the message-independent information;
sending the message-dependent information to an external device;
receiving a digital signature from the external device; and
associating with the processing circuitry the digital signature with the message.

(16) A non-transitory computer-readable medium having a program stored therein that when executed by processing circuitry performs a method, the method comprising:
receiving from another apparatus message-independent information, the message-independent information having been generated by another apparatus and transferred to the interface in advance of a digital signature being generated,
generating with the processing circuitry message dependent information from a message and at least a part of the message-independent information;
sending the message-dependent information to an external device;
receiving a digital signature from the external device; and
associating with the processing circuitry the digital signature with the message.

(17) An information processing apparatus comprising:
interface circuitry configured to
receive message-independent information, the message-independent information having been generated by another device and transferred to the interface circuitry in advance of a digital signature being generated, and
receive signature generation information from an external device; and
processing circuitry configured to
generate the digital signature from the message-independent information and the signature generation information.

(18) The information processing apparatus of (17), wherein
the interface circuitry is configured to exchange information using near-field communications.

(19) The information processing apparatus of (17), wherein the processing circuitry is configured to delete information used to generate digital signatures after a predetermined number of uses.

(20) The information processing apparatus of (19), wherein the processing circuitry is configured to count a number of digital signature generation events and delete the information after the count reaches a predetermined threshold.

(21) The information processing apparatus of (17), wherein the interface circuitry sends to the external device information extracted from the message-independent information and corresponds to the message-dependent information received from the external device.

(22) The information processing apparatus of (17), further comprising:

a non-transitory storage medium having a secure area that only holds information regarding a secret key.

(23) The information processing apparatus of (17), wherein:

the interface circuitry sends to the external device hash values relevant to signature generation so as to reduce communication volume between the external device and the interface circuitry.

(24) The information processing apparatus of (17), wherein:

the processing circuitry generates the digital signature to comply with a MQ protocol.

(25) The information processing apparatus of (17), wherein:

the message-independent information is updated each time a different digital signature is generated.

(26) The information processing apparatus of (17), wherein the information processing apparatus is one of an IC card, a mobile phone and a PDA.

(27) An information processing method comprising:

receiving message-independent information from another device, the message-independent information having been generated and transferred in advance of a digital signature being generated;

receiving signature generation information from an external device; and generating with processing circuitry the digital signature from the message-independent information and the signature generation information.

(28) A non-transitory computer-readable medium having a program stored therein that when executed by processing circuitry performs a method, the method comprising:

receiving message-independent information from another device, the message-independent information having been generated and transferred in advance of a digital signature being generated;

receiving signature generation information from an external device; and generating with processing circuitry the digital signature from the message-independent information and the signature generation information.

(29) An information processing apparatus including:

a message generator that generates a message to which an electronic signature is attached;

a message-dependent information transmitter that transmits, to another apparatus, message-dependent information generated from the message and at least a part of message-independent information received from the other apparatus; and an electronic signature information receiver that receives electronic signature-related information extracted from the message-independent information by the other apparatus on the basis of the message-dependent information.

(30) The information processing apparatus according to (29), further including:

a generation information receiver that receives generation information for generating the message-dependent information; and a message-dependent information generator that generates the message-dependent information from the generation information and the message.

(31) The information processing apparatus according to (30), further including:

an electronic signature generator that generates an electronic signature on the basis of the generation information received by the generation information receiver and the electronic signature-related information.

(32) The information processing apparatus according to (29), further including:

a message-dependent information receiver that receives the message-dependent information from a message-dependent information generating apparatus that generates the message-dependent information from the generation information and the message.

(33) The information processing apparatus according to (30), wherein the generation information receiver receives the generation information as a hash value, and the message-dependent information generator generates the message-dependent information as the hash value of the generation information and a hash value of the message.

(34) The information processing apparatus according to any one of (29) to (33), wherein the other apparatus is an IC card.

(35) The information processing apparatus according to any one of (29) to (34), wherein the electronic signature is an electronic signature according to an MQ protocol.

(36) An information processing apparatus including:

an information retention unit that retains message-independent information which does not depend on a message to which an electronic signature is attached;

a message-independent information transmitter that transmits at least a part of the message-independent information;

a message-dependent information receiver that receives message-dependent information generated from the message-independent information and the message; and an electronic signature information transmitter that transmits electronic signature-related information extracted from the message-independent information on the basis of the message-dependent information.

(37) The information processing apparatus according to (36), wherein the message-independent information transmitter includes a generation information transmitter that transmits, among the message-independent information, generation information for generating message-dependent information, and the message-dependent information receiver receives the message-dependent information generated from the generation information and the message.

(38) The information processing apparatus according to (37), wherein the electronic signature information transmitter transmits a part excluding the generation information from the electronic signature-related information extracted from the message-independent information.

(39) The information processing apparatus according to (37), wherein the generation information transmitter transmits an identification number corresponding to the generation information instead of the generation information, and the message-dependent information receiver receives message-dependent information generated from the message and the generation information that a message-dependent information generating apparatus stores in association with the identification number.

(40) The information processing apparatus according to any one of (36) to (39), wherein the information retention unit includes a secure area that retains information related to a secret key in electronic signature algorithm among the message-independent information, and a non-secure area that retains information not related to the secret key among the message-independent information.

(41) The information processing apparatus according to (37), wherein the generation information transmitter transmits the generation information as a hash value, and the message-dependent information receiver receives the message-dependent information generated as the hash value of the generation information and a hash value of the message.

(42) An information processing system including:

an information processing apparatus including a message generator that generates a message to which an electronic signature is attached, a message-dependent information transmitter that transmits, to another apparatus, message-dependent information generated from the message and at least a part of message-independent information received from the other apparatus, and an electronic signature information receiver that receives electronic signature-related information extracted from the message-independent information by the other apparatus on the basis of the message-dependent information; and an IC card provided including an information retention unit that retains the message-independent information, a message-independent information transmitter that transmits at least a part of the message-independent information, a message-dependent information receiver that receives the message-dependent information generated from the message-independent information and the message, and an electronic signature information transmitter that transmits electronic signature-related information extracted from the message-independent information on the basis of the message-dependent information.

(43) An information processing method including:

generating a message to which an electronic signature is attached;

transmitting, to another apparatus, message-dependent information generated from the message and at least a part of message-independent information received from the other apparatus; and receiving electronic signature-related information extracted from the message-independent information by the other apparatus on the basis of the message-dependent information.

(44) A program for causing a computer to function as:

a message generator that generates a message to which an electronic signature is attached;

a message-dependent information transmitter that transmits, to another apparatus, message-dependent information generated from the message and at least a part of message-independent information received from the other apparatus; and an electronic signature information receiver that receives electronic signature-related information extracted from the message-independent information by the other apparatus on the basis of the message-dependent information.

(45) An information processing method including:

retaining message-independent information which does not depend on a message to which an electronic signature is attached;

transmitting at least a part of the message-independent information;

receiving message-dependent information generated from the message and the message-independent information; and transmitting electronic signature-related information extracted from the message-independent information on the basis of the message-dependent information.

(46) A program for causing a computer to function as:

an information retention unit that retains message-independent information which does not depend on a message to which an electronic signature is attached;

a message-independent information transmitter that transmits at least a part of the message-independent information;

a message-dependent information receiver that receives message-dependent information generated from the message and the message-independent information; and an electronic signature information transmitter that transmits electronic signature-related information extracted from the message-independent information on the basis of the message-dependent information.

REFERENCE SIGNS LIST

200 Second information processing apparatus
202 Message generator
204 Hash value generator
208 Transceiver
300 IC card
302 Information storage unit
304 Transceiver
302a Secure area
302b Non-secure area
400 Server

The invention claimed is:

1. An information processing system, comprising:
interface circuitry configured to:
receive message-dependent information from a first external device, based on reception of message-independent information by the first external device from a second external device;
send the received message-dependent information to the second external device; and
receive a digital signature from the second external device,
wherein the digital signature is generated by the second external device based on reception of a first message by the second external device from a third external device, and
wherein the first message is received by the second external device based on a request to receive the first message, that is transmitted from the second external device to the third external device,
wherein the message-independent information is used in generation of the digital signature, and
wherein the second external device is configured to delete the message-independent information based on the generation of the digital signature for a determined number of times, wherein the determined number of times is greater than one; and
processing circuitry configured to:
send a second message to the first external device based on a request to receive the second message, sent by the first external device,
wherein the message-dependent information is generated by the first external device based on the received second message; and
associate the received digital signature with the second message.

2. The information processing system of claim 1, wherein the interface circuitry is further configured to receive the message-independent information in at least one near field communication message.

3. The information processing system of claim 1, wherein the interface circuitry is further configured to receive the message-independent information used in the generation of the digital signature from the second external device.

4. The information processing system of claim 1, wherein the interface circuitry is further configured to receive, from the second external device, first information extracted from the message-independent information, wherein the first information corresponds to the message-dependent information sent to the first external device.

5. The information processing system of claim 1, further comprising the first external device configured to:
generate a hash value used for the generation of the digital signature; and
send the hash value to at least one of the interface circuitry or the second external device.

6. The information processing system of claim 5, wherein the first external device is further configured to generate the hash value based on an ID number, wherein the ID number is stored or transmitted to the second external device.

7. The information processing system of claim 1,
wherein the second external device includes a secure area configured to hold first information associated with a secret key.

8. The information processing system of claim 1, wherein the interface circuitry is further configured to receive, from the second external device, a hash value relevant to the generation of the digital signature to reduce a communication volume between the second external device and the interface circuitry.

9. The information processing system of claim 1, wherein the digital signature is compliant with an MQ protocol.

10. The information processing system of claim 1, wherein the message-independent information is updated based on the generation of the digital signature for the determined number of times.

11. The information processing system of claim 1, wherein
the processing circuitry is further configured to send the second message with the digital signature to a verifier device.

12. The information processing system of claim 1, wherein the second external device is one of an IC card, a mobile phone, or a PDA.

13. An information processing method, comprising:
receiving message-dependent information from a first external device, based on reception of message-independent information by the first external device from a second external device;
sending a first message to the first external device based on a request to receive the first message is sent by the first external device,
wherein the message-dependent information is generated by the first external device based on the received first message;
sending the received message-dependent information to the second external device;
receiving a digital signature from the second external device,
wherein the digital signature is generated by the second external device based on reception of a second message by the second external device from a third external device,
wherein the second message is received by the second external device based on a request to receive the first message, that is transmitted from the second external device to the third external device,
wherein the message-independent information is used in generation of the digital signature, and
wherein the second external device is configured to delete the message-independent information, based on the generation of the digital signature for a determined number of times, wherein the determined number of times is greater than one; and
associating the received digital signature with the first message.

14. A non-transitory computer-readable medium, having stored thereon, computer-executable instructions that when executed by a processing circuitry, cause the processing circuitry to execute operations, the operations comprising:
receiving message-dependent information from a first external device, based on reception of message-independent information by the first external device from a second external device;
sending a first message to the first external device based on a request to receive the first message is sent by the first external device,
wherein the message-dependent information is generated by the first external device based on the received first message;
sending the received message-dependent information to the second external device;
receiving a digital signature from the second external device,
wherein the digital signature is generated by the second external device based on reception of a second message by the second external device from a third external device;
wherein the second message is received by the second external device based on a request to receive the second message, that is transmitted from the second external device to the third external device;
wherein the message-independent information is used in generation of the digital signature, and
wherein the second external device is configured to delete the message-independent information based on the generation of the digital signature for a determined number of times, wherein the determined number of times is greater than one; and associating the received digital signature with the first message.

15. An information processing apparatus, comprising:
interface circuitry configured to:
receive message-independent information, wherein the message-independent information is generated by a first external device and is transferred to the interface circuitry in advance of a digital signature being generated, and
receive signature generation information generated by a second external device based on reception of a message by the second external device from a third external device,
wherein the message is generated by the third external device,
wherein the message is sent to the second external device based on a request to receive the message, that is transmitted from the second external device and received by the third external device, and
wherein the signature generation information is generated by the second external device based on the received message; and
processing circuitry configured to:
generate the digital signature from the message-independent information and the received signature generation information; and
delete the message-independent information based on the generation of the digital signature for a determined number of times, wherein the determined number of times is greater than one.

16. The information processing apparatus of claim 15, wherein the interface circuitry is further configured to exchange information via near-field communication.

17. The information processing apparatus of claim 15, wherein the interface circuitry is further configured to send information extracted from the message-independent information to the second external device, wherein the information corresponds to the signature generation information received from the second external device.

18. The information processing apparatus of claim 15, further comprising
a non-transitory storage medium having a secure area configured to hold information associated with a secret key.

19. The information processing apparatus of claim 15, wherein
the interface circuitry is further configured to send, to the second external device, hash values relevant to the generation of the signature to reduce a communication volume between the second external device and the interface circuitry.

20. The information processing apparatus of claim 15, wherein
the processing circuitry is further configured to generate the digital signature to comply with a MQ protocol.

21. The information processing apparatus of claim 15, wherein
the message-independent information is updated based on the generation of the digital signature for the determined number of times.

22. The information processing apparatus of claim 15, wherein the information processing apparatus is one of an IC card, a mobile phone or a PDA.

23. An information processing method, comprising:
receiving message-independent information from a first external device, wherein the message-independent information is generated and transferred in advance of a digital signature being generated;
receiving signature generation information generated by a second external device based on reception of a message by the second external device from a third external device,
wherein the message is generated by the third external device,
wherein the message is sent to the second external device based on a request to receive the message, that is transmitted from the second external device and received by the third external device, and
wherein the signature generation information is generated by the second external device based on the received message;
generating, with processing circuitry, the digital signature from the message-independent information and the received signature generation information; and
deleting the message-independent information based on the generation of the digital signature for a determined number of times, wherein the determined number of times is greater than one.

24. A non-transitory computer-readable medium having stored thereon computer-executable instructions, that when executed by a processing circuitry, cause the processing circuitry to execute operations, the operations comprising:
receiving message-independent information from a first external device, wherein the message-independent information is generated and transferred in advance of a digital signature being generated;
receiving signature generation information generated by a second external device based on reception of a message by the second external device from a third external device,
wherein the message is generated by the third external device,
wherein the message is sent to the second external device based on a request to receive the message, that is transmitted from the second external device and received by the third external device, and
wherein the signature generation information is generated by the second external device based on the received message;
generating, with processing circuitry, the digital signature from the message-independent information and the received signature generation information; and
deleting the message-independent information based on the generation of the digital signature for a determined number of times, wherein the determined number of times is greater than one.

* * * * *